(12) United States Patent
Ide

(10) Patent No.: US 9,258,438 B2
(45) Date of Patent: Feb. 9, 2016

(54) INFORMATION PROCESSING APPARATUS, INFORMATION PROCESSING TERMINAL, AND INFORMATION PROCESSING SYSTEM

(71) Applicant: Takahiro Ide, Kanagawa (JP)

(72) Inventor: Takahiro Ide, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/258,529

(22) Filed: Apr. 22, 2014

(65) Prior Publication Data

US 2014/0320884 A1 Oct. 30, 2014

(30) Foreign Application Priority Data

Apr. 26, 2013 (JP) .................. 2013-093961
Feb. 13, 2014 (JP) .................. 2014-025840

(51) Int. Cl.
*G06F 3/12* (2006.01)
*G06K 15/00* (2006.01)
*H04N 1/00* (2006.01)
*H04N 1/32* (2006.01)

(52) U.S. Cl.
CPC .......... *H04N 1/00307* (2013.01); *G06F 3/1207* (2013.01); *G06F 3/1222* (2013.01); *G06F 3/1238* (2013.01); *G06F 3/1259* (2013.01); *G06K 15/4095* (2013.01); *H04N 1/00204* (2013.01); *H04N 1/00482* (2013.01); *H04N 1/32106* (2013.01); *H04N 2201/006* (2013.01); *H04N 2201/0075* (2013.01); *H04N 2201/0094* (2013.01); *H04N 2201/0096* (2013.01); *H04N 2201/3205* (2013.01); *H04N 2201/3222* (2013.01); *H04N 2201/3273* (2013.01); *H04N 2201/3278* (2013.01)

(58) Field of Classification Search
None
See application file for complete search history.

(56) References Cited

U.S. PATENT DOCUMENTS

| | | | | |
|---|---|---|---|---|
| 8,610,908 B2* | 12/2013 | Dan | ............................. | 358/1.13 |
| 8,982,389 B2* | 3/2015 | Sasaki | ........................... | 358/1.15 |
| 2012/0066743 A1* | 3/2012 | Shigehisa et al. | ................. | 726/3 |
| 2012/0081732 A1* | 4/2012 | Sugaya | ........................ | 358/1.13 |

FOREIGN PATENT DOCUMENTS

JP 2012-064030 3/2012

* cited by examiner

*Primary Examiner* — Dov Popovici
(74) *Attorney, Agent, or Firm* — Oblon, McClelland, Maier & Neustadt, L.L.P.

(57) ABSTRACT

An information processing apparatus includes: a first receiving unit that receives pieces of user information on a plurality of users from a plurality of information processing terminals used by the users; an authentication processing unit that performs authentication processing of the users based on the pieces of user information; a first generating unit that generates screen information on a screen used to operate the information processing apparatus for each of the authenticated users; and a first transmitting unit that transmits the screen information to the information processing terminals used by the users corresponding thereto.

6 Claims, 14 Drawing Sheets

INFORMATION PROCESSING APPARATUS, INFORMATION PROCESSING TERMINAL, AND INFORMATION PROCESSING SYSTEM

CROSS-REFERENCE TO RELATED APPLICATIONS

The present application claims priority to and incorporates by reference the entire contents of Japanese Patent Application No. 2013-093961 filed in Japan on Apr. 26, 2013 and Japanese Patent Application No. 2014-025840 filed in Japan on Feb. 13, 2014.

BACKGROUND OF THE INVENTION

1. Field of the Invention

The present invention relates to an information processing apparatus, an information processing terminal, and an information processing system.

2. Description of the Related Art

The recent trend of promoting computerization of information makes information processing apparatuses including printers and facsimiles used to output computerized information and scanners used to computerize documents indispensable. Such information processing apparatuses are frequently provided with a capturing function, an image forming function, and a communication function, and other functions, thereby serving as multifunction peripherals (MFPs) available as a printer, a facsimile, a scanner, and a copier.

On the other hand, the recent sophistication of mobile phones promotes the spread of mobile information processing apparatuses (hereinafter, referred to as "mobile terminals"), such as smartphones and tablet terminals, having information processing functions equivalent to those of personal computers (PCs). Such mobile terminals frequently include interfaces, such as a touch panel, a global positioning system (GPS) function, a velocity sensor, and a wireless communication function, and are available for various uses depending on functions of software programs. Thus, such mobile terminals may be used as a display panel used to operate the information processing apparatuses described above.

In terms of security, such a recent information processing apparatus performs login authentication of a user with an integrated circuit (IC) card or the like. If the login authentication succeeds, the information processing apparatus displays an operation screen and allows the logging-in user to perform an operation permitted for the user. There has been developed a method for detecting, even when a mobile terminal is used as a display panel of an information processing apparatus as described above, a success of login authentication of a user and displaying an operation screen displayed on the information processing apparatus on a display unit of the mobile terminal (refer to Japanese Patent Application Laid-open No. 2012-064030, for example).

Such an information processing apparatus that requires user authentication displays an operation screen used by an authenticated user. While the user is logging in, other users cannot perform operations. The technology disclosed in Japanese Patent Application Laid-open No. 2012-064030 does not consider the case where, while a certain user is logging in, other users perform operations on the information processing apparatus.

Therefore, it is desirable to provide an information processing apparatus, an information processing terminal, and an information processing system that enable a plurality of users to perform operations in parallel on an information processing apparatus that requires user authentication.

SUMMARY OF THE INVENTION

It is an object of the present invention to at least partially solve the problems in the conventional technology.

According to an aspect of the present invention, there is provided an information processing apparatus including: a first receiving unit that receives pieces of user information on a plurality of users from a plurality of information processing terminals used by the users; an authentication processing unit that performs authentication processing of the users based on the pieces of user information; a first generating unit that generates screen information on a screen used to operate the information processing apparatus for each of the authenticated users; and a first transmitting unit that transmits the screen information to the information processing terminals used by the users corresponding thereto.

According to another aspect of the present invention, there is provided an information processing terminal including: a second transmitting unit that transmits user information to an information processing apparatus; a third receiving unit that receives screen information on a screen used to operate the information processing apparatus from the information processing apparatus; and a first display unit that displays the screen corresponding to the screen information.

According to still another aspect of the present invention, there is provided an information processing system including: a plurality of information processing terminals; and an information processing apparatus connected to the information processing terminals, wherein the information processing apparatus includes: a first receiving unit that receives pieces of user information on a plurality of users from the information processing terminals used by the users; an authentication processing unit that performs authentication processing of the users based on the pieces of user information; a first generating unit that generates screen information on a screen used to operate the information processing apparatus for each of the authenticated users; and a first transmitting unit that transmits the screen information to the information processing terminals used by the users corresponding thereto, and the information processing terminal includes: a second transmitting unit that transmits the pieces of user information to the information processing apparatus; a third receiving unit that receives the screen information from the information processing apparatus; and a first display unit that displays the screen corresponding to the screen information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are described below in greater detail with reference to the accompanying drawings.

First Embodiment

Figure 1:
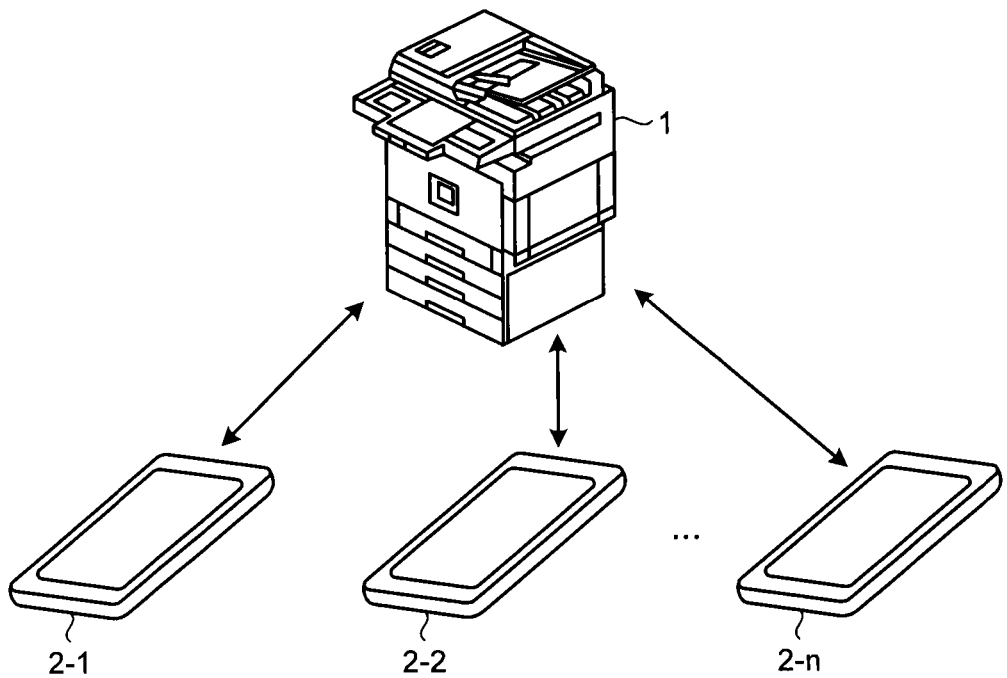
FIG. 1 is a schematic of an example of an information processing system according to a first embodiment.

FIG. 1 is a schematic of an example of an information processing system according to a first embodiment of the present invention. The information processing system according to the present embodiment includes an information processing apparatus 1 and n information processing terminals 2-1 to 2-n (n is an integer of 2 or more) communicably connected to each other. The information processing terminals 2-1 to 2-n may be simply referred to as an information processing terminal 2 without any distinction.

The information processing apparatus 1 performs one or a plurality of pieces of processing in response to a command. Examples of the information processing apparatus 1 include image processing apparatuses, vending apparatuses, and guide apparatuses. The information processing apparatus 1 is not limited thereto.

An image processing apparatus has a function to process an image. The image processing apparatus performs at least one of printing, facsimile processing, scanning, and copying, for example. In response to a command, a vending apparatus outputs information on a commodity corresponding to the command, provides the commodity corresponding to the command, and makes a charge for the commodity corresponding to the command. A guide apparatus displays information on an item corresponding to a command and performs various types of processing corresponding to the command. While examples of the item include a place, a route (a map), a commodity name, a dish menu, and a waiting list in a hospital, the item is not limited thereto.

The present embodiment describes a case where the information processing apparatus 1 is a multifunction peripheral (MFP), for example. The MFP has a function to perform various types of processing, such as printing, facsimile processing, and scanning.

In the present embodiment, the information processing terminal 2 functions as an operating unit that operates the information processing apparatus 1. In other words, the information processing terminal 2 transmits a command indicating processing to be performed by the information processing apparatus 1 to the information processing apparatus 1. Examples of the information processing terminal 2 include smartphones, tablet terminals, and personal digital assistants (PDAs). By installing an application program provided by a manufacturer that provides the information processing apparatus 1 or a third party, the information processing terminal 2 functions as an operating unit that operates the information processing apparatus 1.

Figure 2:
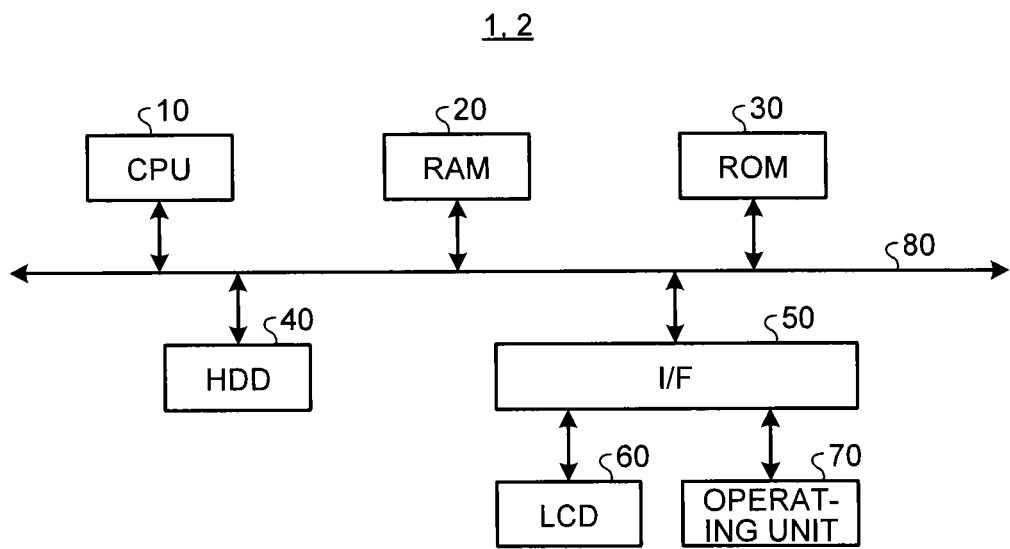
FIG. 2 is a block diagram of the hardware configuration of an information processing apparatus and an information processing terminal.

The following describes the hardware configuration of the information processing apparatus 1 and the information processing terminal 2. FIG. 2 is a block diagram of the hardware configuration of the information processing apparatus 1 and the information processing terminal 2. The information processing apparatus 1 and the information processing terminal 2 have a configuration similar to that of typical servers or personal computers (PC), for example.

The information processing apparatus 1 and the information processing terminal 2 include a central processing unit (CPU) 10, a random access memory (RAM) 20, a read only memory (ROM) 30, a hard disk drive (HDD) 40, and an interface (I/F) 50 connected to one another via a bus 80. The I/F 50 is connected to a liquid crystal display (LCD) 60 and an operating unit 70. The information processing apparatus 1 further includes an engine (an executing unit) that performs various types of processing.

The CPU 10 controls the entire operation of the information processing apparatus 1 and the information processing terminal 2. The RAM 20 is used as a work area of the CPU 10. The ROM 30 stores therein computer programs, such as firmware. The HDD 40 stores therein an operating system (OS) and various types of control programs, and application programs, for example. Instead of or in addition to the HDD 40, a semiconductor storage device, such as a solid state drive (SSD), may be used.

The I/F 50 connects the bus 80 and various types of hardware, networks, and the like, and controls these components. The LCD 60 is a known display device. The operating unit 70 is a user interface, such as a keyboard, a mouse, various types of hard buttons, and a touch panel, used by a user to input information.

Figure 3:
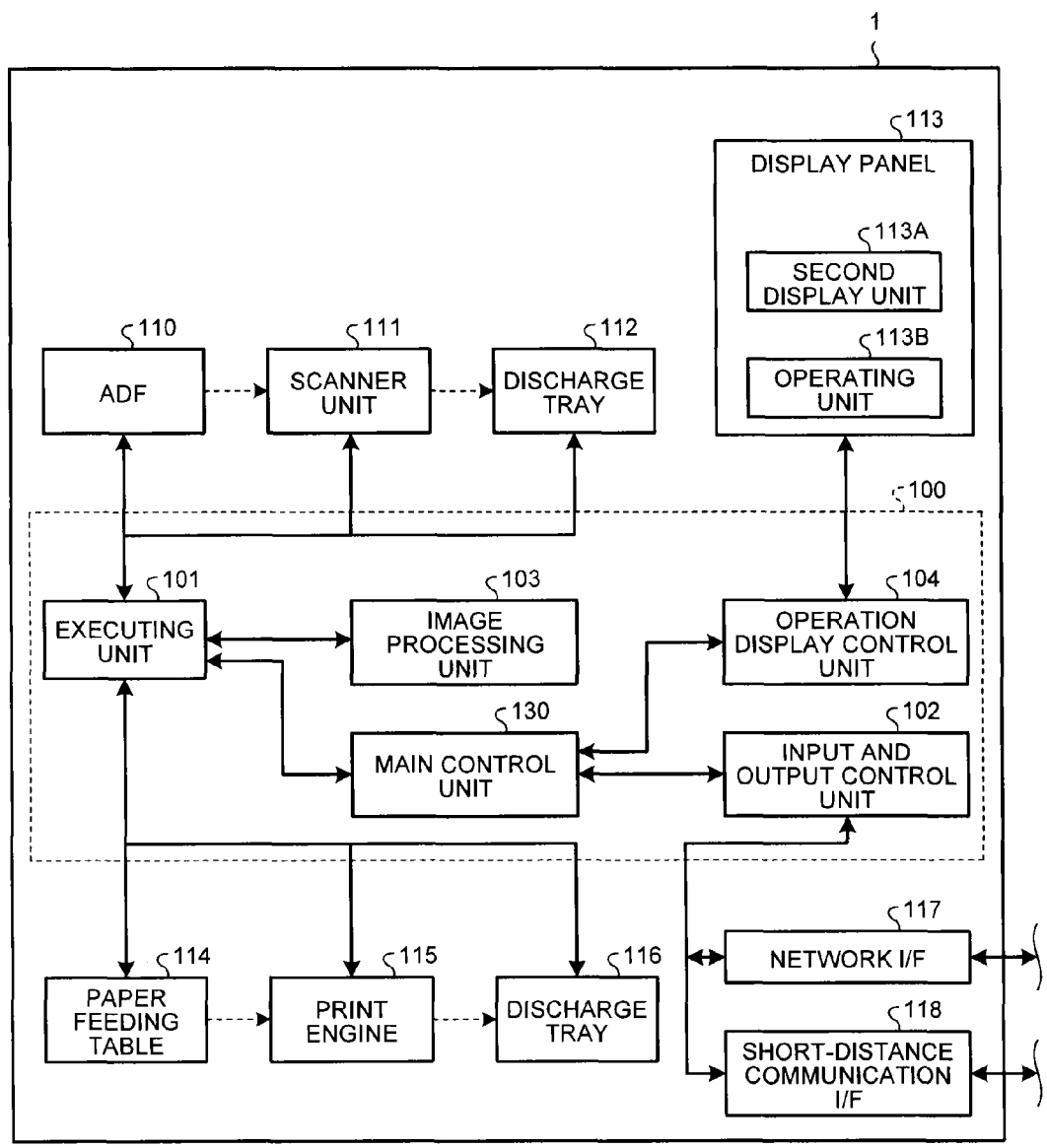
FIG. 3 is a block diagram of the functional configuration of the information processing apparatus.

The information processing apparatus 1 according to the present embodiment will now be described. FIG. 3 is a block diagram of the functional configuration of the information processing apparatus 1 according to the present embodiment. As illustrated in FIG. 3, the information processing apparatus 1 according to the present embodiment includes a controller 100, an auto document feeder (ADF) 110, a scanner unit 111, a discharge tray 112, a display panel 113, a paper feeding table 114, a print engine 115, a discharge tray 116, a network I/F 117, and a short-distance communication I/F 118.

The print engine 115 forms an image corresponding to drawing information on a sheet. The print engine 115 performs known image formation processing. Specific features of the print engine 115 include an ink-jet image forming mechanism and an electrophotographic image forming mechanism. The scanner unit 111 acquires capturing information on a document. The scanner unit 111 has a function to perform known scanning.

The controller 100 includes a main control unit 130, an executing unit 101, an input and output control unit 102, an image processing unit 103, and an operation display control unit 104. Because the present embodiment describes the case where the information processing apparatus 1 is an MFP as described above, the information processing apparatus 1 includes the scanner unit 111 and the print engine 115 in the present embodiment. FIG. 3 indicates electrical connection with the solid arrows and indicates a flow of a sheet with the dashed arrows.

The display panel 113 includes a second display unit 113A and an operating unit 113B. The second display unit 113A displays various types of information, such as an image. The operating unit 113B receives an operating instruction from the user. The second display unit 113A corresponds to the LCD 60. The operating unit 113B corresponds to the operating unit 70.

The network I/F 117 is used to perform communications with a plurality of information processing terminals 2 and other devices via a network. Examples of the network I/F 117 include interfaces for Ethernet (registered trademark) and Universal Serial Bus (USB).

The short-distance communication I/F 118 is used to perform communications with a plurality of information processing terminals 2 and other devices via short-distance wireless communications. Examples of the short-distance communication I/F 118 include interfaces for Bluetooth (registered trademark), Wireless Fidelity (Wi-Fi), and FeliCa (registered trademark).

The controller 100 is formed as a combination of software and hardware. Specifically, the CPU 10 loads control programs, such as firmware, stored in a non-volatile storage medium including the ROM 30 and the HDD 40 into the RAM 20. The CPU 10 performs an operation based on the computer programs, thereby establishing a software control unit. The controller 100 is formed of the software control unit and hardware, such as an integrated circuit (IC). The controller 100 functions as a control unit that collectively controls the information processing apparatus 1.

The main control unit 130 controls each unit included in the controller 100. The main control unit 130 issues a command to each unit of the controller 100. The executing unit 101 performs processing corresponding to a command received from the information processing terminal 2. In the present embodiment, the executing unit 101 causes the print engine 115, the scanner unit 111, the image processing unit 103, and other units to perform processing corresponding to the received command. The input and output control unit 102 outputs various types of information received via the network I/F 117 or the short-distance communication I/F 118 to the main control unit 130. The main control unit 130 controls the input and output control unit 102 to transmit the information to the information processing terminal 2, for example, via the network I/F 117, the short-distance communication I/F 118, and a network.

The image processing unit 103 generates drawing information based on image information to be printed under the control of the main control unit 130. The print engine 115 forms an image corresponding to the drawing information on a sheet. The image processing unit 103 processes capturing information received from the scanner unit 111, thereby generating image data. The image data is stored in the information processing apparatus 1 as a result of the scanning operation. The image data may be transmitted to other devices via the network I/F 117 and the short-distance communication I/F 118. The operation display control unit 104 performs control to display various types of images on the second display unit 113A. The operation display control unit 104 outputs information received via the operating unit 113B to the main control unit 130.

The following describes a case where the information processing apparatus 1 performs printing as processing. The input and output control unit 102 receives a print job including a print instruction (command) via the network I/F 117. The input and output control unit 102 transfers the received print job to the main control unit 130. The main control unit 130 receives the print job and causes the image processing unit 103 to generate drawing information. The image processing unit 103 generates the drawing information corresponding to the command (print instruction) based on document information or image information included in the print job. The executing unit 101 controls the print engine 115 to form an image corresponding to the drawing information on a sheet conveyed from the paper feeding table 114. The sheet on which the image is formed is discharged onto the discharge tray 116.

The following describes a case where the information processing apparatus 1 performs scanning as processing. If the operation display control unit 104 or the input and output control unit 102 receives a scanning execution instruction (command), the operation display control unit 104 or the input and output control unit 102 outputs a scanning execution signal to the main control unit 130. The main control unit 130 controls the executing unit 101 based on the received scanning execution instruction (command). Depending on the scanning execution instruction (command), the executing unit 101 drives the ADF 110 to convey a document set on the ADF 110 to the scanner unit 111. Depending on the scanning execution instruction (command), the executing unit 101 also drives the scanner unit 111 to capture the document conveyed from the ADF 110. If no document is set on the ADF 110 and a document is directly set on the scanner unit 111, the scanner unit 111 captures the set document.

In the scanning, photoelectric conversion elements (CODs), such as charge-coupled devices (CODs), included in the scanner unit 111, optically scans the document, thereby generating capturing information based on optical information. The executing unit 101 transfers the capturing information generated by the scanner unit 111 to the image processing unit 103. The image processing unit 103 generates image data based on the capturing information under the control of the executing unit 101.

The following describes a case where the information processing apparatus 1 performs copying as processing. The executing unit 101 receives capturing information from the scanner unit 111. The executing unit 101 causes the image processing unit 103 to generate drawing information. The executing unit 101 drives the print engine 115 based on the drawing information.

The functional configuration of the information processing terminal 2 will now be described.

Figure 4:
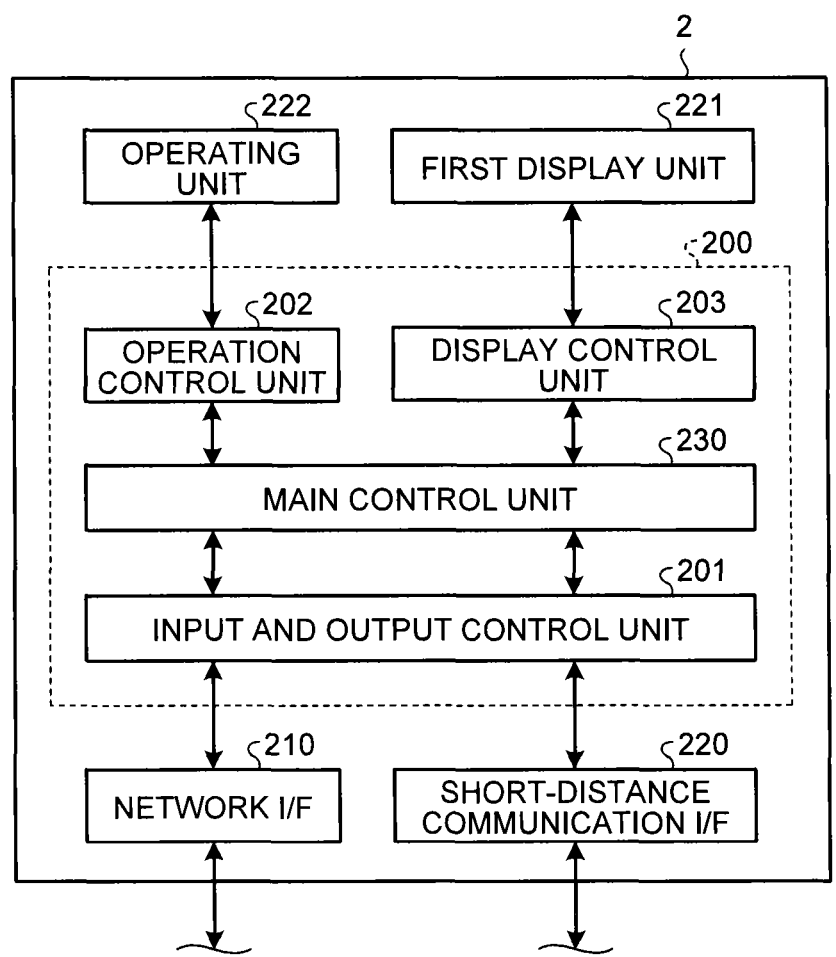
FIG. 4 is a block diagram of the functional configuration of the information processing terminal.

FIG. 4 is a block diagram of the functional configuration of the information processing terminal 2. The information processing terminal 2 includes a first display unit 221, an operating unit 222, a controller 200, a network I/F 210, and a short-distance communication I/F 220. The controller 200 includes an input and output control unit 201, an operation control unit 202, a display control unit 203, and a main control unit 230. The first display unit 221 corresponds to the LCD 60 illustrated in FIG. 2, and the operating unit 222 corresponds to the operating unit 70 illustrated in FIG. 2.

The network I/F 210 is used to perform communications with the information processing apparatus 1 and other devices via a network. Examples of the network I/F 210 include an interface for Ethernet (registered trademark). The short-distance communication I/F 220 is used to perform communications with the information processing apparatus 1 and other devices via short-distance wireless communications. Examples of the short-distance communication I/F 220 include interfaces for Bluetooth (registered trademark), Wi-Fi, and FeliCa (registered trademark). The network I/F 210 and the short-distance communication I/F 220 are provided as the I/F 50 illustrated in FIG. 2.

The controller 200 is formed as a combination of software and hardware. The controller 200 functions as a control unit that collectively controls the information processing terminal 2. The input and output control unit 201 acquires information from the information processing apparatus 1 and other devices via the network I/F 210. The input and output control unit 201 transmits information to the information processing apparatus 1 and other devices via the network I/F 210. The input and output control unit 201 also acquires information from the information processing apparatus 1 and other devices via the short-distance communication I/F 220. The input and output control unit 201 also transmits information to the information processing apparatus 1 and other devices via the short-distance communication I/F 220.

The operation control unit 202 acquires a signal indicating the contents of an operation performed by the user from the operating unit 222. The operation control unit 202 outputs the signal indicating the contents of the operation to a module, such as the main control unit 230, that operates in the information processing terminal 2. The display control unit 203 performs control to display various types of images on the first display unit 221.

The main control unit 230 performs various types of functions carried out by the information processing terminal 2.

Figure 5:
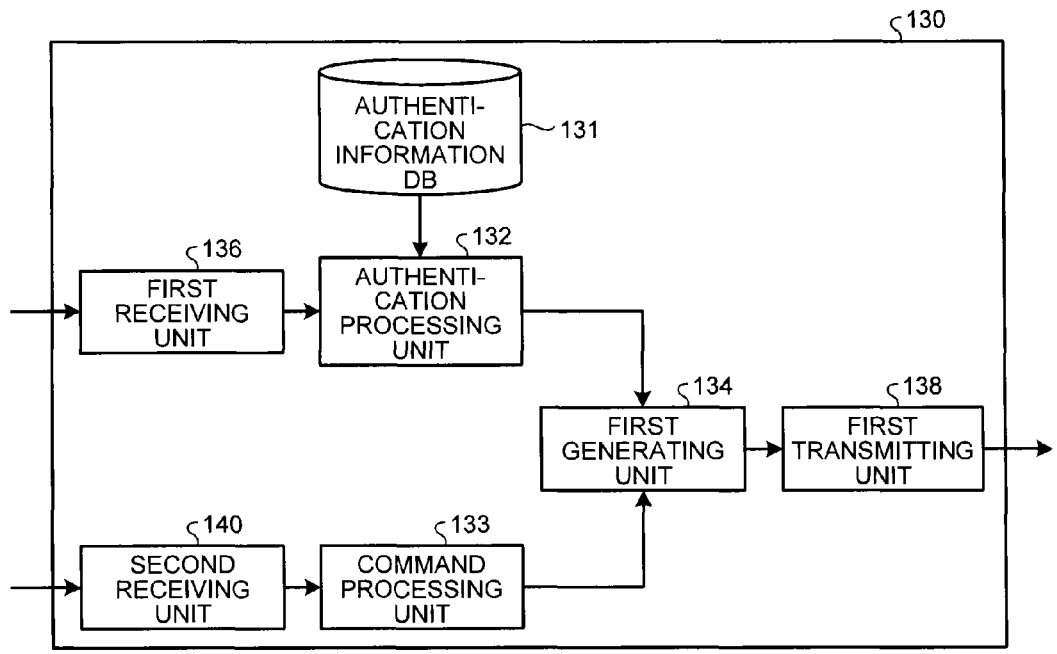
FIG. 5 is a block diagram of the functional configuration of a main control unit of the information processing apparatus.

FIG. 5 is a block diagram of an exemplary functional configuration of the main control unit 130 of the information processing apparatus 1. The main control unit 130 includes an authentication information database (DB) 131, an authentication processing unit 132, a command processing unit 133, a first generating unit 134, a first transmitting unit 138, a first receiving unit 136, and a second receiving unit 140.

A part or all of the authentication processing unit 132, the first generating unit 134, the first transmitting unit 138, the first receiving unit 136, and the second receiving unit 140 may be provided by a processor, such as a CPU, executing a computer program, that is, by software, may be provided by hardware, such as an IC, or may be provided by combining software and hardware.

The authentication information DB 131 stores therein authentication information used for authentication of a user. The authentication information associates a user ID indicating identification information for uniquely identifying a user with a password used to authenticate the user, for example. The first receiving unit 136 receives user information from the information processing terminal 2. The user information includes a user ID, a password, and a use history, for example.

The use history is a use history of the information processing apparatus 1 of the user identified by the user ID. The use history associates processing of which command was previously issued by the user to the information processing apparatus 1, a date and time of execution of the processing, and setting information used when the processing was performed with one another. The use history may further include other information.

The setting information indicates conditions made when the information processing apparatus 1 performs the processing. In the case of printing, the setting information includes a sheet size and a magnification, for example.

In the present embodiment, the first receiving unit 136 receives pieces of user information on a plurality of users who use a plurality of information processing terminals 2 from the respective information processing terminals 2. The first receiving unit 136 outputs the user information to the authentication processing unit 132.

The authentication processing unit 132 receives the user information from the first receiving unit 136. Based on the received user information and the authentication information stored in the authentication information DB 131, the authentication processing unit 132 performs authentication processing of the users.

Specifically, the authentication processing unit 132 acquires a password corresponding to a user ID included in the received user information from the authentication information DB 131. If the acquired password is identical to the password included in the user information, the authentication processing unit 132 authenticates the user. The authenticated user is logging in the information processing apparatus 1. The authentication processing unit 132 outputs the user information on the authenticated user to the first generating unit 134.

The second receiving unit 140 receives a command indicating processing to be performed by the executing unit 101 from the information processing terminals 2. Examples of the command include a print request, a copying start request, and a scanning start request. The command simply needs to be a command corresponding to processing executable by the information processing apparatus 1 and is determined depending on the processing executable by the information processing apparatus 1. The command is not limited to the requests described above.

The command processing unit 133 causes the executing unit 101 to perform processing corresponding to the command received by the second receiving unit 140. If the processing corresponding to the command received by the second receiving unit 140 is copying, for example, the command processing unit 133 causes the executing unit 101 to perform copying. The command processing unit 133 outputs processing information indicating the current state of the processing (e.g., in printing and printing completion) in the information processing apparatus 1 to the first generating unit 134.

The first generating unit 134 receives the user information from the authentication processing unit 132. The first generating unit 134 generates screen information for each of the authenticated users based on the use history included in the user information.

The screen information is information on a screen to be displayed on the first display unit 221 of the information processing terminal 2. The screen information is information on a screen used to operate the information processing apparatus 1 with the information processing terminals 2. The information processing terminal 2 is used by the user identified by the user ID included in the user information. In other words, the screen information is used when the screen used to operate the information processing apparatus 1 is displayed on the information processing terminal 2.

The screen information includes at least one of the operation screen information, the execution screen information, and the execution completion information.

The operation screen information is information on an operation screen. The operation screen is displayed on the first display unit 221 of the information processing terminal 2 when the information processing apparatus 1 is operated with the information processing terminal 2. The operation screen includes a selection image used by the user to select processing to be performed by the information processing apparatus 1 and setting information used when the processing is performed.

Examples of the selection image include an image (e.g., a button image and a character image) indicating processing previously selected by the user and an image (e.g., a button image and a character image) indicating a list of processing executable by the information processing apparatus 1. The previously selected processing is processing corresponding to the last command transmitted by the user to the information processing apparatus 1 with the information processing terminal 2. While the following describes an example in which the selection image is an image indicating processing previously selected by the user, the selection image is not limited thereto.

The execution screen information is used when an execution screen is displayed by the information processing terminal 2. The execution screen is displayed on the information processing terminal 2 when the information processing apparatus 1 performs or is performing the processing corresponding to the command received from the information processing terminal 2. The execution screen information includes the contents of processing being performed by the information processing apparatus 1, for example.

The first generating unit 134 receives the user information from the authentication processing unit 132. The first generating unit 134 generates operation screen information from the use history included in the user information. An assumption is made that the last processing instructed to perform by the user out of the processing included in the use history is copying and that setting information used when the processing is performed indicates a specific sheet size and a specific magnification, for example. In this case, the first generating unit 134 generates operation screen information on an operation screen including an image indicating copying and the setting information.

In other words, the first generating unit 134 generates, for each of the authenticated users, the operation screen information corresponding to the user.

The first generating unit 134 receives a command indicating the processing selected by the information processing apparatus 1 from the command processing unit 133. The first generating unit 134 also receives processing information from the command processing unit 133. The processing information indicates the current state of the processing (e.g., in printing and printing completion) in the information processing apparatus 1.

The first generating unit 134 generates execution screen information from the command and the processing information received from the command processing unit 133. An assumption is made that the command indicates "copying" and that the processing information includes information indicating "in printing", for example. In this case, the first generating unit 134 generates execution screen information on an execution screen including an image (a button image and a text image) indicating that "copying is being performed by the information processing apparatus 1".

If the processing information received from the command processing unit 133 indicates completion of processing, the first generating unit 134 generates execution completion information.

After generating the screen information, the first generating unit 134 outputs the screen information to the first transmitting unit 138. Specifically, if the first generating unit 134 generates operation screen information as the screen information, the first generating unit 134 outputs the generated operation screen information to the first transmitting unit 138.

If the first generating unit 134 generates execution screen information as the screen information, the first generating unit 134 outputs the generated execution screen information to the first transmitting unit 138. If the first generating unit 134 generates execution completion information as the screen information, the first generating unit 134 outputs the generated execution completion information to the first transmitting unit 138.

The first transmitting unit 138 transmits the screen information received from the first generating unit 134 to the information processing terminal 2 used by the corresponding user. Specifically, the first transmitting unit 138 transmits the operation screen information received from the first generating unit 134 to the corresponding information processing terminal 2. The first transmitting unit 138 transmits the execution screen information received from the first generating unit 134 to the corresponding information processing terminal 2. The first transmitting unit 138 transmits the execution completion information received from the first generating unit 134 to the corresponding information processing terminal 2.

The first transmitting unit 138, for example, may determine "the information processing terminal 2 used by the corresponding user" by the following method. The user information received from the information processing terminal 2 includes a user ID, a password, a use history, and a communication address, for example. The communication address is used for communications with the information processing terminal 2 serving as the source of the user information. The first transmitting unit 138 reads the communication address included in the user information corresponding to the screen information to be transmitted. Thus, the first transmitting unit 138 determines "the information processing terminal 2 used by the corresponding user". The first transmitting unit 138 transmits image information to the communication address, thereby transmitting the image information to the corresponding information processing terminal 2. The communication address is not necessarily included in the user information. In this case, the information processing terminal 2 may transmit the communication address of the information processing terminal 2 together with the user information to the information processing apparatus 1.

The functional configuration of the main control unit 230 of the information processing terminal 2 will now be described.

Figure 6:
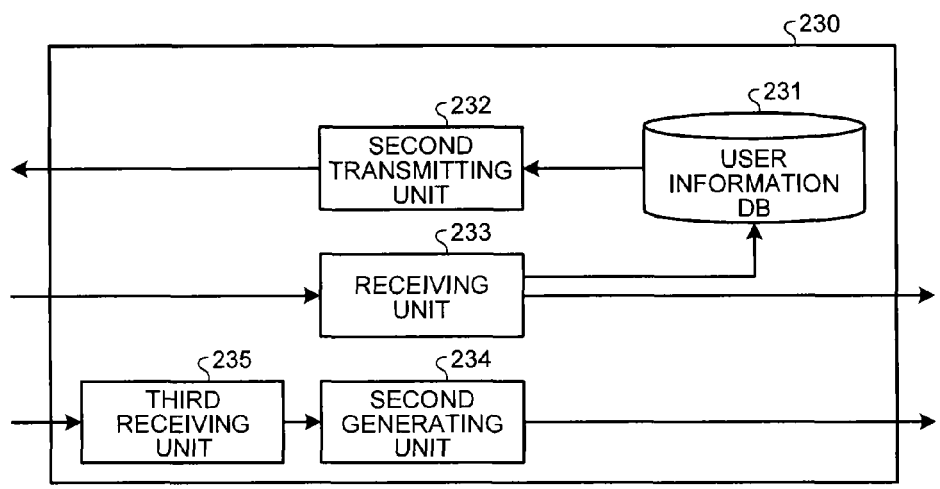
FIG. 6 is a block diagram of the functional configuration of a main control unit of the information processing terminal.

FIG. 6 is a block diagram of an exemplary functional configuration of the main control unit 230 of the information processing terminal 2. The main control unit 230 includes a user information DB 231, a second transmitting unit 232, a receiving unit 233, a second generating unit 234, and a third receiving unit 235.

A part or all of the second transmitting unit 232, the receiving unit 233, the second generating unit 234, and the third receiving unit 235 may be provided by a processor, such as a CPU, executing a computer program, that is, by software, may be provided by hardware, such as an IC, or may be provided by combining software and hardware.

The user information DB 231 stores therein the user information on the user who uses the information processing terminal 2. The second transmitting unit 232 transmits the user information stored in the user information DB 231 to the information processing apparatus 1 via the input and output control unit 201 and the network I/F 210 or the short-distance communication I/F 220 (refer to FIG. 4). In the case of the information processing terminal 2 using an interface for FeliCa (registered trademark) as the short-distance communication I/F 220, for example, the user information is transmitted by bringing the information processing terminal 2 closer to a FeliCa reader of the information processing apparatus 1.

The main control unit 230 may control the display control unit 203 to display a login screen on the first display unit 221 (refer to FIG. 4). The login screen is displayed on the first display unit 221 by starting a dedicated application for operating the information processing apparatus 1 in the information processing terminal 2, for example. The user operates the operating unit 222 while viewing the login screen, thereby inputting the user ID and the password. The main control unit 230 receives the user ID and the password via the operating unit 222 and the operation control unit 202 (refer to FIG. 4). The second transmitting unit 232 of the main control unit 230 transmits user information including the received user ID and the password to the information processing apparatus 1.

The receiving unit 233 receives various types of instructions input by the user through the screen (the operation screen, the execution screen, or the execution completion screen) displayed on the first display unit 221 from the operating unit 222 via the operation control unit 202.

Specifically, the receiving unit 233 receives a command input by the user through the operation screen displayed on the first display unit 221 and indicating processing to be performed by the information processing apparatus 1 from the operating unit 222. The command includes at least the processing to be performed by the information processing apparatus 1 and setting information used when the processing is performed.

The receiving unit 233 receives a command input by the user through the execution screen displayed on the first display unit 221 and indicating execution or cancel of processing from the operating unit 222.

The receiving unit 233 transmits the received various types of commands to the information processing apparatus 1.

The receiving unit 233 stores a use history in the user information DB 231 based on the received command. The use history includes processing corresponding to the command transmitted to the information processing apparatus 1, an execution date and time (command date and time) of the processing, and setting information for the processing.

The third receiving unit 235 receives screen information from the information processing apparatus 1. The screen information includes at least one of the operation screen information, the execution screen information, and the execution completion information as described above. The third receiving unit 235 outputs the received screen information to the second generating unit 234.

The second generating unit 234 receives the screen information from the third receiving unit 235. If the second generating unit 234 receives operation screen information as the screen information, the second generating unit 234 generates display information for an operation screen based on the operation screen information and outputs the display information to the display control unit 203. The display control unit 203 uses the received display information to control the first display unit 221 so as to display the operation screen. The first display unit 221 displays the operation screen.

If the second generating unit 234 receives execution screen information as the screen information, the second generating unit 234 generates display information for an execution screen based on the execution screen information and outputs the display information to the display control unit 203. The display control unit 203 uses the received display information to control the first display unit 221 so as to display the execution screen. The first display unit 221 displays the execution screen.

As a result, the first display units 221 of the respective information processing terminals 2 each display an operation screen for the user who uses the corresponding information processing terminal 2 and is authenticated by the information processing apparatus 1. In other words, the first display unit 221 of the information processing terminal 2 displays the operation screen corresponding to the use history or the like of the information processing apparatus 1 of the user who is authenticated by the information processing apparatus 1 and uses the information processing terminal 2.

The first display units 221 of the respective information processing terminals 2 each display an execution screen for the user who uses the corresponding information processing terminal 2 and is authenticated by the information processing apparatus 1.

Figure 7A:
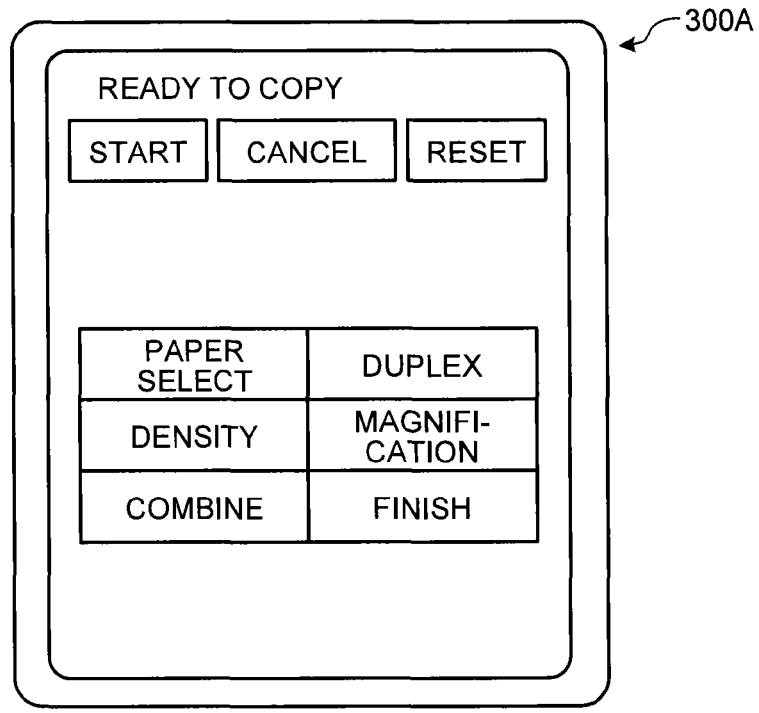
FIGS. 7A and 7B are schematics of examples of an operation screen.
Figure 7B:
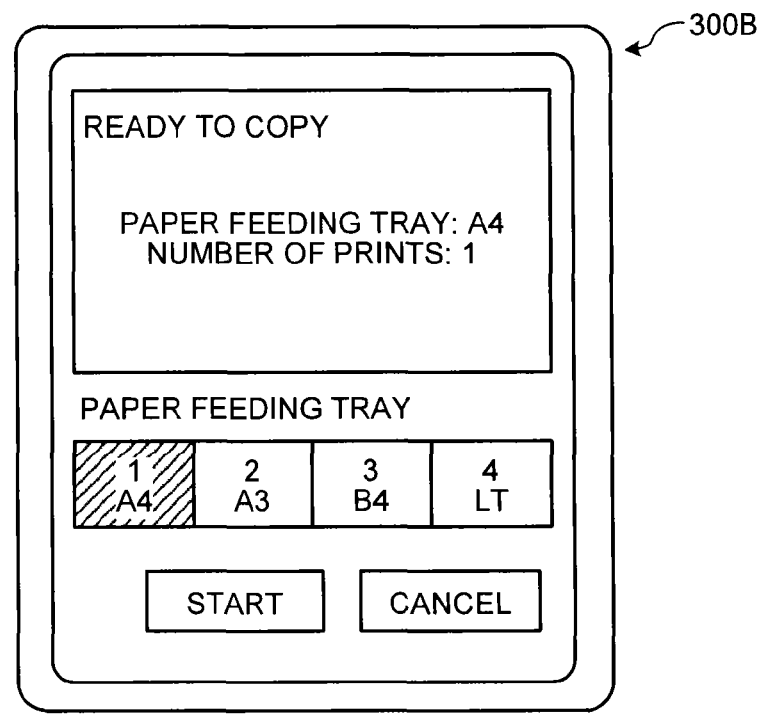

FIGS. 7A and 7B are schematics of examples of the operation screen.

FIG. 7A is an exemplary schematic of an operation screen 300A displayed on the information processing terminal 2 used by a user A. The user A is authenticated by the information processing apparatus 1 and is logging in the information processing apparatus 1. FIG. 7B is an exemplary schematic of an operation screen 300B displayed on the information processing terminal 2 used by a user B. The user B is authenticated by the information processing apparatus 1 while the user A is logging in and logs in the information processing apparatus 1 after the user A did.

As illustrated in FIG. 7A, the information processing terminal 2 used by the user A displays the operation screen 300A including button images used by the user to select copying based on the use history of the user A. By contrast, as illustrated in FIG. 7B, the information processing terminal 2 used by the user B displays the operation screen 300B including button images used by the user to select printing based on the use history of the user B. The operation screen 300B displays a state where an A4 paper feeding tray has been selected as the previously set setting information based on the use history of the user B.

When a plurality of users are authenticated and are logging in the information processing apparatus 1 as described above, the information processing terminals 2 of the respective users each display an operation screen for the corresponding user.

As described above, the first receiving unit 136 of the information processing apparatus 1 according to the present embodiment receives pieces of user information on a plurality of users from the information processing terminals 2 used by the respective users. The authentication processing unit 132 performs authentication processing of the users based on the user information. The first generating unit 134 generates screen information on a screen used to operate the information processing apparatus 1 for each of the authenticated users. The first transmitting unit 138 transmits the screen information to the information processing terminal 2 used by the corresponding user.

The second transmitting unit 232 of the information processing terminal 2 transmits the user information to the information processing apparatus 1. The third receiving unit 235 receives the screen information from the information processing apparatus 1. The display control unit 203 displays a screen corresponding to the screen information received from the information processing apparatus 1 on the first display unit 221.

As a result, the information processing terminals 2 each display a screen used to operate the information processing apparatus 1 for the user who uses the corresponding information processing terminal 2. This enables a plurality of users logging in the information processing apparatus 1 to operate the information processing apparatus 1 in parallel through the screens displayed on the respective information processing terminals 2.

The information processing system, the information processing apparatus 1, and the information processing terminal 2 according to the present embodiment enable a plurality of users to perform operations in parallel on the information processing apparatus 1 that requires user authentication.

Second Embodiment

A second embodiment of the present invention describes a case where a plurality of users logging in an information processing apparatus 1 can grasp their states and the like to one another.

Figure 8:
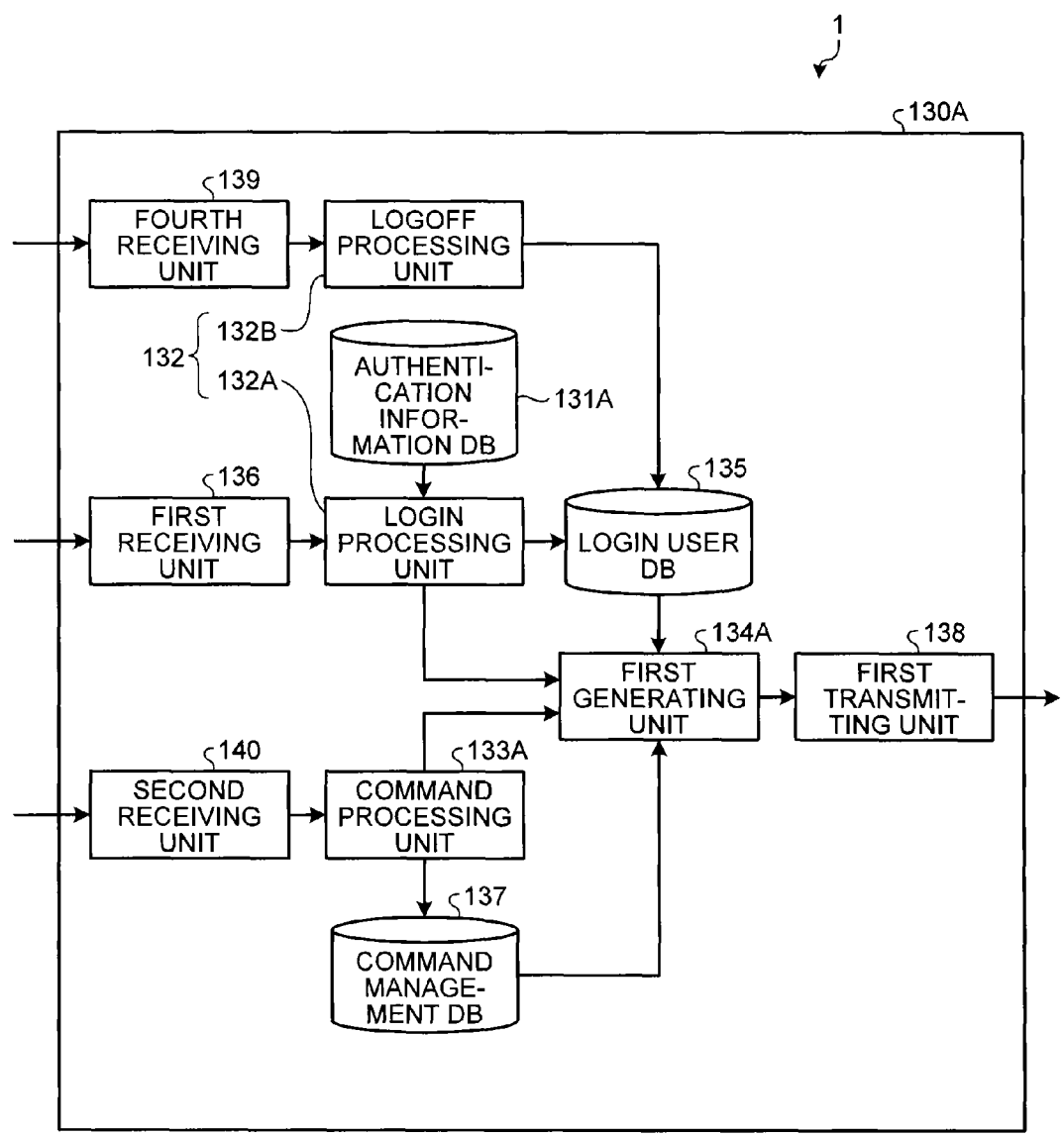
FIG. 8 is a block diagram of the functional configuration of a main control unit of an information processing apparatus according to a second embodiment of the present invention.

FIG. 8 is a block diagram of an exemplary functional configuration of a main control unit 130A of the information processing apparatus 1 according to the second embodiment. The information processing apparatus 1 according to the second embodiment has the same configuration as that of the first embodiment except that the main control unit 130A is provided instead of the main control unit 130 described in the first embodiment.

The main control unit 130A includes an authentication information DB 131A, an authentication processing unit 132, a command processing unit 133A, a first generating unit 134A, a first transmitting unit 138, a login user DB 135, a first receiving unit 136, a command management DB 137, a second receiving unit 140, and a fourth receiving unit 139.

A part or all of the authentication processing unit 132, the command processing unit 133A, the first generating unit 134A, the first transmitting unit 138, the first receiving unit 136, the second receiving unit 140, and the fourth receiving unit 139 may be provided by a processor, such as a CPU, executing a computer program, that is, by software, may be provided by hardware, such as an IC, or may be provided by combining software and hardware.

The first transmitting unit 138, the first receiving unit 136, and the second receiving unit 140 are identical to those of the main control unit 130 according to the first embodiment.

The authentication information DB 131A stores therein authentication information and group information in a manner associated with each other. The authentication information is identical to that in the first embodiment. In other words, the authentication information associates a user ID with a password. The group information indicates a group to which each user belongs when a plurality of users who use respective information processing terminals 2 are classified into a plurality of groups based on a predetermined classification condition. The classification condition includes an area (e.g., a building, a room in a building, and a floor in a building) at which a user is likely to be present when transmitting various types of commands to the information processing apparatus 1 with the information processing terminal 2, a position of the user, an employment form of the user, and an age bracket of the user, for example. The classification condition can be optionally set and is not limited thereto.

An assumption is made that the classification condition is defined as a floor in a certain building at which a user is likely to be present when transmitting various types of commands to the information processing apparatus 1 with the information processing terminal 2, for example. In this case, floor information including the first floor and the second floor in a certain building is set as the group information.

The authentication processing unit 132 includes a login processing unit 132A and a logoff processing unit 132B. The login processing unit 132A receives user information from the first receiving unit 136. Based on the received user information and authentication information stored in the authentication information DB 131A, the login processing unit 132A performs authentication processing of the users. The authenticated user is logging in the information processing apparatus 1.

The fourth receiving unit 139 receives user information including a logoff request from the information processing terminal 2. The fourth receiving unit 139 outputs the received user information to the logoff processing unit 132B.

The login user DB 135 stores therein user information on a logging-in user authenticated by the login processing unit 132A and group information corresponding thereto.

If the login processing unit 132A authenticates a user, the login processing unit 132A stores the user information on the authenticated user and group information corresponding to the user information in the login user DB 135. The login processing unit 132A reads group information corresponding to authentication information serving as the user information (the user ID and the password) of the authenticated user from the authentication information DB 131A, thereby storing the group information in the login user DB 135.

In the present embodiment, the main control unit 130A stores in advance a user ID and a user name identified by the user ID in a manner associated with each other in a memory, which is not illustrated. If the login processing unit 132A authenticates a user, the login processing unit 132A stores the user information (the user ID, the password, and the user name) of the authenticated user and group information corresponding to the user information in the login user DB 135.

The logoff processing unit 132B receives user information including logoff information from the fourth receiving unit 139. If the logoff processing unit 132B receives user information including logoff information, the logoff processing unit 132B deletes a user ID and a password in the user information including the logoff information and group information corresponding to the user ID from the login user DB 135.

Thus, the login user DB 135 stores therein the user information and the group information on the user logging in the information processing apparatus 1.

Similarly to the command processing unit 133 according to the first embodiment, the command processing unit 133A causes an executing unit 101 to perform processing corresponding to a command received by the second receiving unit 140 from the information processing terminal 2. In the present embodiment, the command processing unit 133A outputs the command and processing information indicating the current state of the processing (e.g., in printing and printing completion) in the information processing apparatus 1 to the first generating unit 134A.

The command management DB 137 stores therein command information. The command information associates identification information on a command, a user ID of a user who uses the information processing terminal 2 that transmits the command, and data capacity of data used for processing corresponding to the command.

The command processing unit 133A stores identification information on a command received by the second receiving unit 140 and a user ID included in user information received from the information processing terminal 2 serving as the source of the command in the command management DB 137. The command processing unit 133A calculates data capacity of data used for processing corresponding to the command based on the command received from the information processing terminal 2. If the processing corresponding to the command is printing, for example, the command processing unit 133A calculates data capacity of a print job. The command processing unit 133A stores the calculated data capacity in the command management DB 137 in a manner associated with the identification information on the command corresponding thereto. Thus, the command processing unit 133A stores the command information in the command management DB 137.

The command processing unit 133A sequentially executes the commands stored in the command management DB 137. Specifically, the command processing unit 133A causes the executing unit 101 to perform processing corresponding to the command identified by the identification information on the command stored in the command management DB 137 in order of storing the command information. After the execution of the processing is completed, the command processing unit 133A deletes the corresponding command information from the command management DB 137.

Similarly to the first generating unit 134 according to the first embodiment, the first generating unit 134A generates screen information. As described above, the screen information includes at least one of the operation screen information, the execution screen information, and the execution completion information. In the present embodiment, the first generating unit 134A further generates operation screen information with login information and execution screen information with standby information.

The operation screen information with login information will now be described. The login information is information on the authenticated user logging in the information processing apparatus 1. Specifically, the login information includes at least one of the user names of the other users logging in the information processing apparatus 1 and the number of users logging in the information processing apparatus 1. The number of users logging in the information processing apparatus 1 may be the number of the other users logging in the information processing apparatus 1 or the number of all the users logging in the information processing apparatus 1.

Specifically, the first generating unit 134A reads user information on users logging in the information processing apparatus 1 from the login user DB 135. The first generating unit 134A calculates the number of pieces of read user information. Thus, the first generating unit 134A calculates the number of all the users logging in the information processing apparatus 1. If the pieces of read user information include a plurality of pieces of user information including the same user ID, the first generating unit 134A determines that the users are the same person and calculates the number of users.

The first generating unit 134A creates screen information for each of the information processing terminals 2. Out of the pieces of user information read from the login user DB 135, the first generating unit 134A reads pieces of user information other than that of a user serving as a target of transmission as pieces of user information on the other users. The user serving as a target of transmission indicates a user to which the information processing apparatus 1 is to generate and transmit screen information. The first generating unit 134A reads user names included in the pieces of user information on the other users. Thus, the first generating unit 134A derives the user names of the other users logging in the information processing apparatus 1.

With the processing described above, the first generating unit 134A creates login information including at least one of the user names of the other users logging in the information processing apparatus 1 and the number of users logging in the information processing apparatus 1. The first generating unit 134A creates operation screen information with login information, which is operation screen information including the created login information.

As described in the first embodiment, the operation screen information is information on an operation screen including a selection image used by the user to select processing to be performed by the information processing apparatus 1 and setting information used when the processing is performed.

FIGS. 9A, 9B, 10A, and 10B are schematics of examples of the operation screen based on the operation screen information with login information. FIGS. 9A, 9B, 10A, and 10B are schematics of examples of the operation screen displayed on the information processing terminal 2 used by the user A who is authenticated.

Figure 9A:
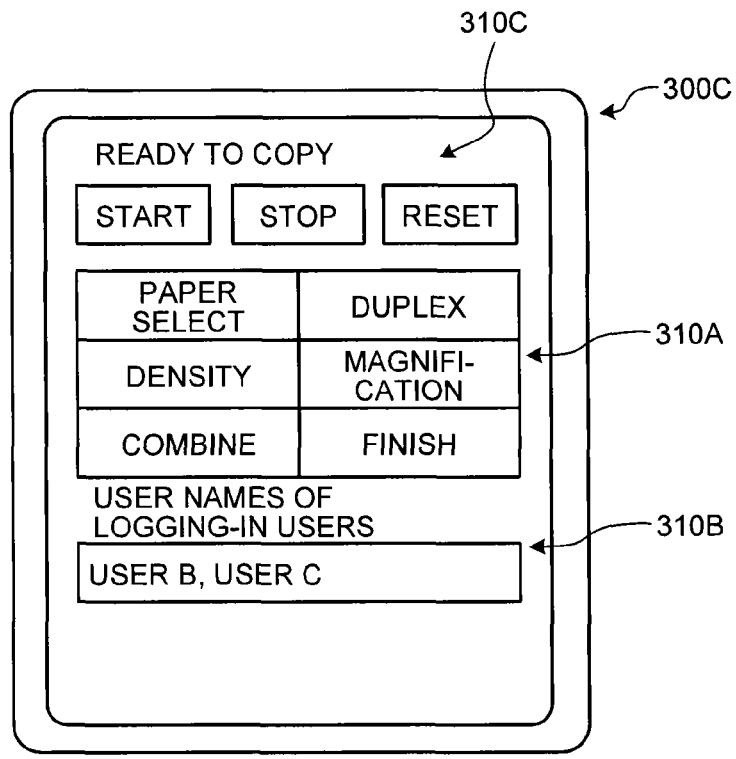
FIGS. 9A and 9B are schematics of examples of the operation screen.

FIG. 9A is an exemplary schematic of an operation screen 300C. The operation screen 300C includes a selection image 310C indicating processing previously selected by the user A, setting information 310A, and login information 310B. The login information 310B includes the user names of logging-in users of "user B and user C". As a result, the information processing terminal 2 displays the information that the other logging-in users are "user B and user C".

Figure 9B:
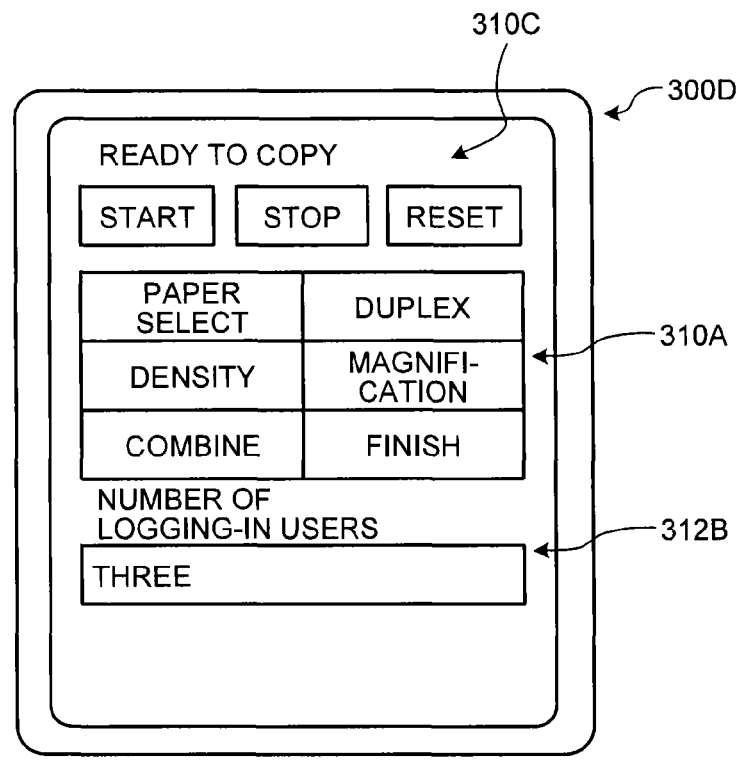

FIG. 9B is an exemplary schematic of an operation screen 300D. The operation screen 300D includes the selection image 310C indicating processing previously selected by the user A, the setting information 310A, and login information 312B. The login information 312B includes the number of logging-in users of "three". As a result, the information processing terminal 2 displays the information that the number of the logging-in users is "three".

Figure 10A:
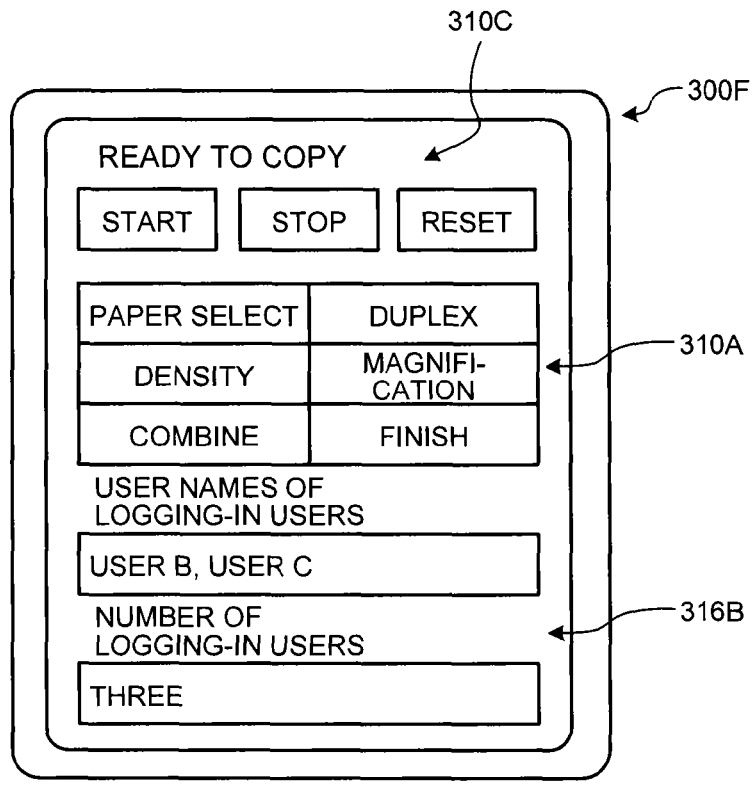
FIGS. 10A and 10B are schematics of examples of the operation screen.

FIG. 10A is an exemplary schematic of an operation screen 300F. The operation screen 300F includes the selection image 310C indicating processing previously selected by the user A, the setting information 310A, and login information 316B. The login information 316B includes the user names of logging-in users of "user B and user C" and the number of logging-in users of "three". As a result, the information processing terminal 2 displays the information that the other logging-in users are "user B and user C" and that the number of logging-in users is "three".

The user names of the users logging in the information processing apparatus 1 included in the login information may be the user names of a part of the users logging in the information processing apparatus 1.

In other words, the first generating unit 134A may generate login information defining a user satisfying a predetermined condition as an object to be displayed and defining a user not satisfying the condition as an object to be hidden. The predetermined condition can be optionally changed.

The predetermined condition may be optionally determined. An example of the predetermined condition includes a "user belonging to the same group as the user serving as a target of transmission does". In this case, the first generating unit 134A sets a user belonging to the same group as the user serving as a target of transmission does as an object to be displayed out of the users logging in the information processing apparatus 1. The first generating unit 134A sets a user belonging to a different group from the group to which the user serving as a target of transmission belongs as an object to be hidden out of the users logging in the information processing apparatus 1.

The first generating unit 134A may determine whether a user belongs to the same group as the user serving as a target of transmission does by reading the login user DB 135. In other words, the first generating unit 134A reads the group information corresponding to the user IDs of the users logging in the information processing apparatus 1 from the login user DB 135. The first generating unit 134A sets a user with a user ID associated with the group information same as that of the user serving as a target of transmission as an object to be displayed.

The first generating unit 134A generates login information indicating that the user name of the user set as an object to be displayed is the user name of a user logging in the information processing apparatus 1.

Thus, the first generating unit 134A generates login information in which the user names of a part of the other users logging in the information processing apparatus 1 are hidden. The first generating unit 134A creates operation screen information including the created login information.

Figure 10B:
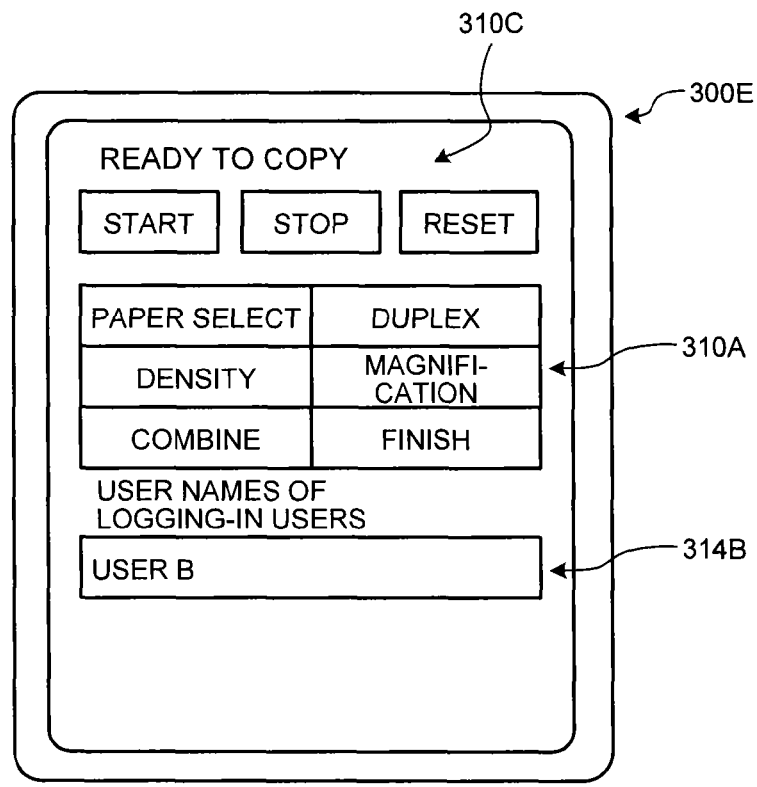

FIG. 10B is an exemplary schematic of an operation screen 300E.

In the case where the other users actually logging in the information processing apparatus 1 are the user B and the user C, the login information 310B of the operation screen 300C illustrated in FIG. 9A includes the user names of logging-in users of "user B and user C". By contrast, in the case where a part of the user names is hidden, the operation screen 300E illustrated in FIG. 10B is displayed. An assumption is made that the user C does not satisfy the predetermined condition, for example. In this case, login information 314B of the operation screen 300E includes only the user name of the logging-in user of "user B". As a result, the information processing terminal 2 displays "user B", which is a part of the other logging-in users.

The predetermined condition is not limited to the condition described above. An example of the predetermined condition may include a condition that "user information received from the information processing terminal 2 at the time of login includes information indicating "disclosure permitted".

In this case, the display processing terminal 2, for example, displays a selection button indicating "disclosure permitted" or "disclosure not permitted" on the first display unit 221 (refer to FIG. 4) when transmitting the user information to the information processing apparatus 1. If the user issues an operating instruction through the operating unit 222 (refer to FIG. 4), thereby selecting "disclosure permitted", the information processing terminal 2 transmits the user information including disclosure information indicating "disclosure permitted" to the information processing apparatus 1. If the user issues an operating instruction through the operating unit 222, thereby selecting "disclosure not permitted", the information processing terminal 2 transmits the user information including disclosure information indicating "disclosure not permitted" to the information processing apparatus 1.

The first generating unit 134A sets a user whose disclosure information included in the user information stored in the login user DB 135 indicates "disclosure permitted" as an object to be displayed out of the users logging in the information processing apparatus 1. The first generating unit 134A sets a user whose disclosure information included in the user information stored in the login user DB 135 indicates "disclosure not permitted" as an object to be hidden out of the users logging in the information processing apparatus 1.

The first generating unit 134A generates login information defining the user name of the user set as an object to be displayed as the user name of the user logging in the information processing apparatus 1. Thus, the first generating unit 134A generates the login information in which the user names of a part of the users logging in the information processing apparatus 1 are hidden. The first generating unit 134A creates operation screen information including the created login information.

Referring back to FIG. 8, the first generating unit 134A according to the present embodiment generates execution screen information with standby information. The execution screen information with standby information is execution screen information including standby information.

The standby information indicates a standby state of processing corresponding to a command (which may also be referred to as a "job") in the information processing apparatus 1. In the present embodiment, the standby information includes at least one of the user name of a user whose command is being executed, the user name of a waiting user, the number of waiting users, the number of waiting commands, and the waiting time until execution of processing.

The user name of a user whose command is being executed is the user name of a user who uses the information processing terminal 2 and whose processing corresponding to a command transmitted to the information processing apparatus 1 with the information processing terminal 2 is being executed by the information processing apparatus 1. The user name of a waiting user is the user name of a user who uses the information processing terminal 2 and whose processing corresponding to a command transmitted to the information processing apparatus 1 with the information processing terminal 2 is yet to be executed by the information processing apparatus 1.

The first generating unit 134A generates standby information based on a command whose processing is yet to be completed out of the commands received from the information processing terminals 2. Specifically, the first generating unit 134A reads pieces of command information stored in the command management DB 137. The first generating unit 134A acquires a user name corresponding to a user ID included in the first command information stored in the command management DB 137 out of the pieces of read command information as the user name of a user whose command is being executed. The command processing unit 133A may set a flag indicating "being executed" on the command information corresponding to the processing being performed by the executing unit 101 of the information processing apparatus 1. In this case, the first generating unit 134A simply needs to acquire a user name corresponding to a user ID included in the command information on which the flag is set as the user name of a user whose command is being executed.

The first generating unit 134A reads user IDs included in all the pieces of command information read from the command management DB 137. The first generating unit 134A acquires user names corresponding to user IDs other than the user ID of the user whose command is being executed as the user names of waiting users.

The first generating unit 134A calculates the number of the acquired user names of the waiting users. Thus, the first generating unit 134A calculates the number of waiting users.

The first generating unit 134A may read user IDs included in pieces of command information stored in the command management DB 137 before the command information including the user ID of the user serving as a target of transmission out of all the pieces of command information read from the command management DB 137. The first generating unit 134A may acquire user names corresponding to user IDs other than the user ID of the user whose command is being executed as the user names of waiting users.

The first generating unit 134A may subtract the number of pieces of command information being executed from the number of pieces of command information read from the command management DB 137, thereby obtaining a subtraction value as the number of waiting commands.

The first generating unit 134A may subtract the number of pieces of command information being executed from the number of pieces of command information stored in the command management DB 137 before the command information including the user ID of the user serving as a target of transmission out of all the pieces of command information read from the command management DB 137, thereby obtaining a subtraction value as the number of waiting commands.

The first generating unit 134A calculates the sum of data capacity of data used for processing corresponding to a command included in each piece of command information read from the command management DB 137. The first generating unit 134A calculates the waiting time until execution of the processing from the calculated sum. The expression for the waiting time may be determined in advance depending on the processing speed of the information processing apparatus 1, for example.

The first generating unit 134A may calculate the sum of data capacity of the pieces of command information stored in the command management DB 137 before the command information including the user ID of the user serving as a target of transmission out of all the pieces of command information read from the command management DB 137. The first generating unit 134A may calculate the waiting time until execution of processing in the same manner as described above.

The first generating unit 134A generates execution screen information with standby information including at least one of the user name of the user whose command is being executed, the user names of waiting users, the number of waiting users, the number of waiting commands, and the waiting time until execution of processing.

Figure 11:
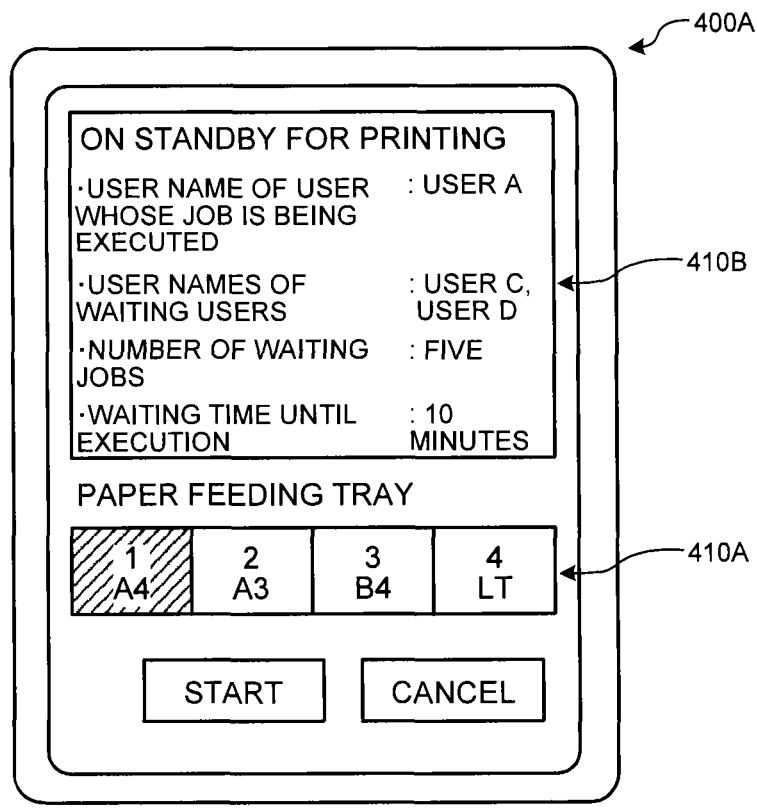
FIG. 11 is a schematic of an example of an execution screen.

FIG. 11 is a schematic of an example of an execution screen 400A based on the execution screen information with standby information. FIG. 11 is an exemplary schematic of the execution screen 400A displayed on the information processing terminal 2 used by the user B who is authenticated and is logging in. FIG. 11 is a schematic of an example of the execution screen 400A displayed on the information processing terminal 2 when the information processing apparatus 1 performs printing in response to a print start command.

The execution screen 400A includes standby information 410B and setting information 410A. The standby information 410B includes the user name of a user whose job is being executed of "user A", the user names of waiting users of "user C and user D", the number of waiting jobs (commands) of "5", and the waiting time until execution of "10 minutes". The setting information 410A is setting information used for processing corresponding to a command transmitted by the user B to the information processing apparatus 1.

The information processing apparatus 1 transmits the execution screen information with standby information on the execution screen 400A to the information processing terminal 2 of the user B. As a result, the first display unit 221 of the information processing terminal 2 of the user B displays the execution screen 400A. In other words, the information processing terminal 2 used by the user B displays the information that a print job of the user B waits to be executed because a job (processing) of the user A is being performed. The information processing terminal 2 also displays the information that the user names of the other waiting users are the user C and the user D, that the number of waiting jobs is 5, and that a waiting time of about 10 minutes is required until execution of the processing.

As described in the first embodiment, the execution screen is displayed on the information processing terminal 2 when the information processing apparatus 1 performs or is performing the processing instructed by the information processing terminal 2. The contents displayed on the execution screen 400A are not limited to those illustrated in FIG. 11.

The execution screen 400A illustrated in FIG. 11 includes the user name of the user whose command is being executed, the user names of waiting users, the number of waiting commands, and the waiting time until execution of processing as the standby information 410B. As described above, however, the standby information may include at least one of the user name of a user whose command is being executed, the user name of a waiting user, the number of waiting users, the number of waiting commands, and the waiting time until execution of processing.

In the present embodiment, the first generating unit 134A generates the operation screen information with login information and the execution screen information with standby information. The first generating unit 134A may generate execution screen information with login information. The first generating unit 134A may also generate operation screen information with standby information.

The following describes a process to display an operation screen on the information processing terminal 2 in the information processing system according to the present embodiment.

Figure 12:
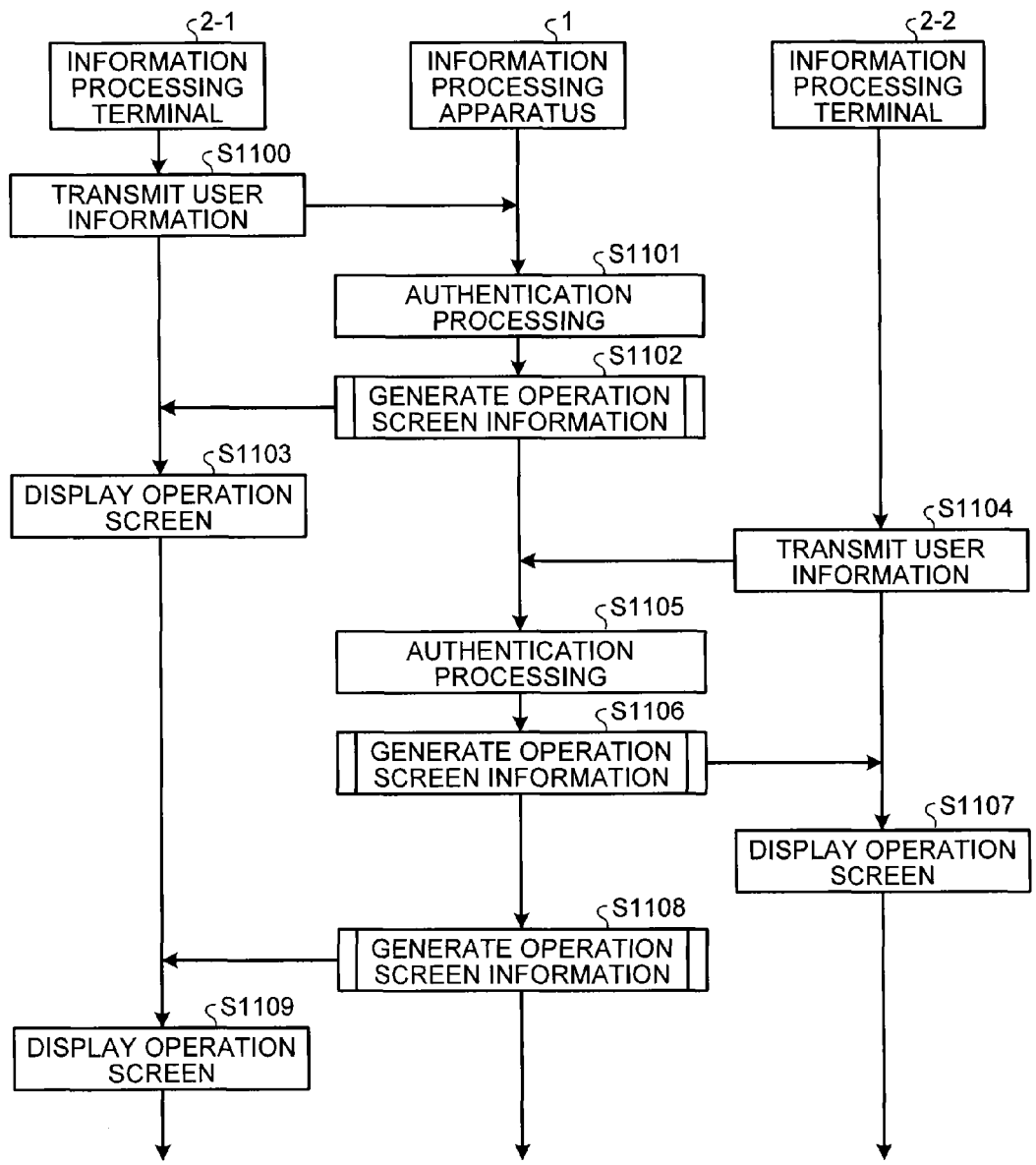
FIG. 12 is a sequence diagram of operations performed until the operation screen is displayed.

FIG. 12 is a sequence diagram of operations performed until the operation screen is displayed on the information processing terminal 2. In FIG. 12, each of information processing terminals 2-1 and 2-2 is connected to the information processing apparatus 1 via wired or wireless communications. An assumption is made that the user A uses the information processing terminal 2-1 and that the user B uses the information processing terminal 2-2. The number and the types of information processing terminals 2 connected to the information processing apparatus 1 and the users who use the respective information processing terminals 2 are not limited thereto.

The information processing terminal 2-1 transmits user information A of the user A who uses the information processing terminal 2-1 to the information processing apparatus 1 (Step S1100). The information processing apparatus 1 receives the user information A from the information processing terminal 2-1 and then performs authentication processing of the user A based on the received user information A (Step S1101). If the authentication of the user A succeeds, the information processing apparatus 1 performs operation screen information generation processing based on a use history or the like of the user A included in the user information A (Step S1102) (which will be described later in detail). With the processing at Step S1102, the information processing apparatus 1 generates operation screen information on the operation screen 300A illustrated in FIG. 7A, for example. The information processing apparatus 1 transmits the operation screen information to the information processing terminal 2-1 (Step S1102).

The information processing terminal 2-1 receives the operation screen information from the information processing apparatus 1 and then generates display information for the operation screen based on the operation screen information. The information processing terminal 2-1 displays the operation screen on the first display unit 221 (Step S1103). With the processing at Step S1103, the first display unit 221 displays the operation screen 300A illustrated in FIG. 7A, for example.

By contrast, the information processing terminal 2-2 transmits user information B of the user B who uses the information processing terminal 2-2 to the information processing apparatus 1 (Step S1104). The information processing apparatus 1 receives the user information B and then performs authentication processing of the user B based on the received user information B (Step S1105).

If the authentication of the user B succeeds, the information processing apparatus 1 performs operation screen information generation processing based on a use history or the like of the user B included in the user information B (Step S1106) (which will be described later in detail). With the processing at Step S1106, the information processing apparatus 1 generates operation screen information with login information. The information processing apparatus 1 transmits the operation screen information with login information to the information processing terminal 2-2.

The information processing terminal 2-2 acquires the operation screen information with login information from the information processing apparatus 1 and then generates display information for the operation screen based on the operation screen information with login information. The information processing terminal 2-2 displays the operation screen on the first display unit 221 (Step S1107).

Because the user B also logs in the information processing apparatus 1, the information processing apparatus 1 performs operation screen information generation processing for the user A who logged in before the user B does (Step S1108) (which will be described later in detail). With the processing at Step S1108, the information processing apparatus 1 generates operation screen information with login information. The information processing apparatus 1 transmits the operation screen information with login information to the information processing terminal 2-1.

The information processing terminal 2-1 acquires the operation screen information with login information from the information processing apparatus 1 and then generates display information for the operation screen based on the operation screen information with login information. The information processing terminal 2-1 displays the operation screen on the first display unit 221 (Step S1109).

Figure 13:
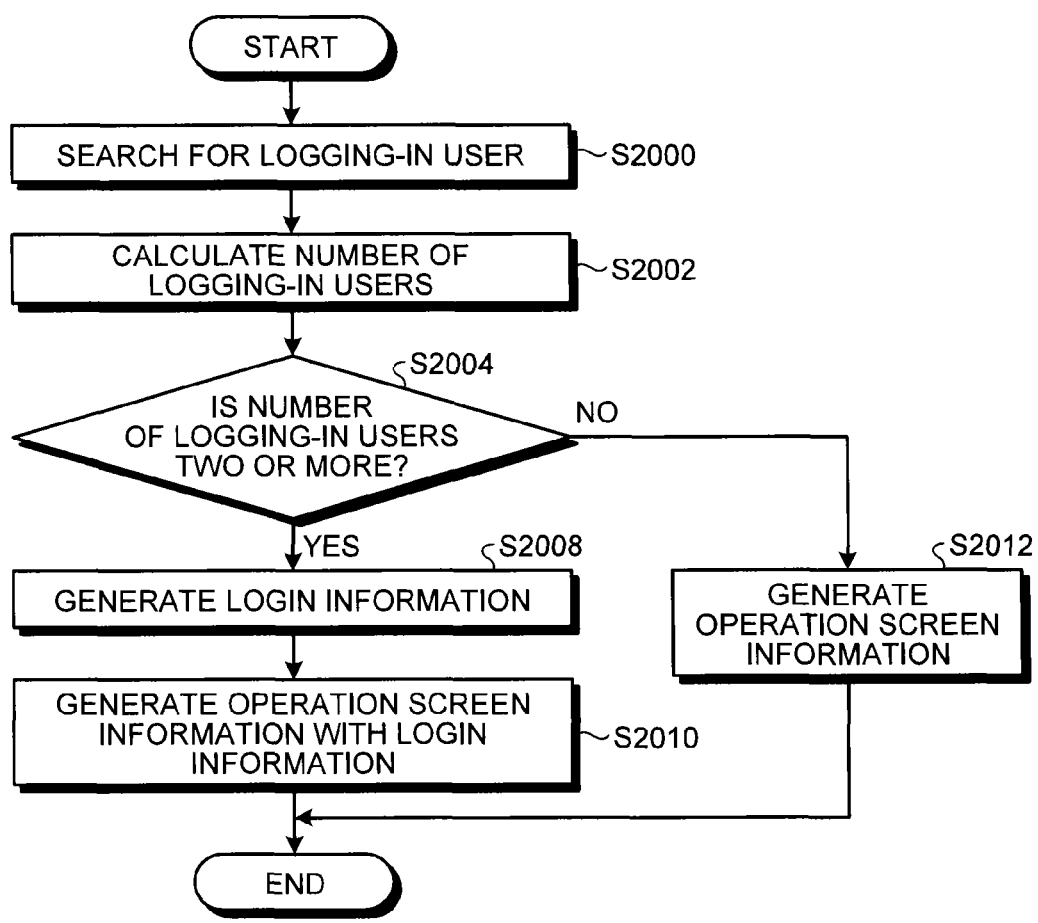
FIG. 13 is a flowchart of a process of operation screen information generation processing.

FIG. 13 is a flowchart of a process of the operation screen information generation processing performed at Step S1102, Step S1106, and Step S1108 in FIG. 12.

The first generating unit 134A of the information processing apparatus 1 searches for a user logging in the information processing apparatus 1 (Step S2000). At Step S2000, the first generating unit 134A reads user information on a user logging in the information processing apparatus 1 from the login user DB 135.

The first generating unit 134A calculates the number of all the logging-in users (Step S2002).

The first generating unit 134A determines whether the number of users logging in the information processing apparatus 1 is two or more (Step S2004). If the number of the users is two or more (Yes at Step S2004), the first generating unit 134A generates login information including the number of logging-in users (Step S2008).

At this time, the first generating unit 134A may generate login information including the number of the logging-in users and the user names of the logging-in users. Alternatively, the first generating unit 134A may generate login information including the user names of the logging-in users.

The first generating unit 134A generates operation screen information with login information (Step S2010). In other words, the first generating unit 134A generates the operation screen information with login information including the login information generated at Step S2008, a selection screen, and setting information. The selection screen and the setting information are generated based on a use history or the like included in user information on the user serving as a target of transmission. The present routine is then ended.

By contrast, if negative determination is made at Step S2004 (No at Step S2004), the first generating unit 134A generates operation screen information including no login information (Step S2012). The present routine is then ended.

With the operation screen information generation processing at Step S1102, the first generating unit 134A generates the operation screen information on the operation screen 300A illustrated in FIG. 7A, for example. With the operation screen information generation processing at Step S1106 and Step S1108, the first generating unit 134A generates the operation screen information on the operation screen 300D illustrated in FIG. 9B, for example. In this case, the login information 312B included in the operation screen 300D indicates "two" of the user A and the user B.

When only the user A is logging in the information processing apparatus 1, the information processing terminal 2-1 used by the user A displays the operation screen 300A illustrated in FIG. 7A. When the other user B logs in, the operation screen displayed on the information processing terminal 2-1 is switched to an operation screen corresponding to the operation screen information with login information.

If the other user A already logs in the information processing apparatus 1 when the user B logs in the information processing apparatus 1, the information processing terminal 2-2 used by the user B displays an operation screen corresponding to the operation screen information with login information.

The following describes operation screen information generation processing performed to hide a part of the user names of logging-in users.

Figure 14:
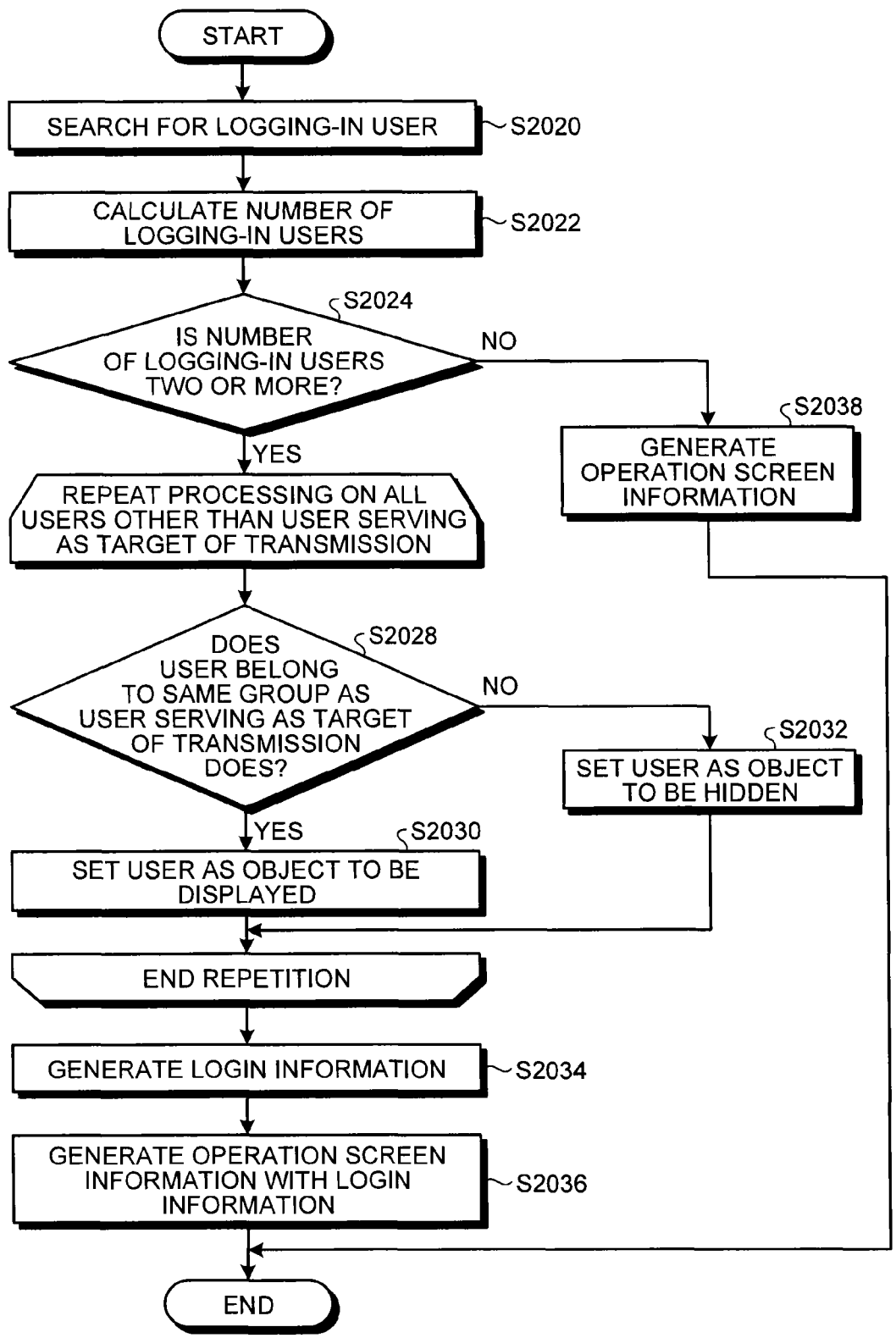
FIG. 14 is a flowchart of another process of the operation screen information generation processing.

FIG. 14 is a flowchart of another process of the operation screen information generation processing performed at Step S1102, Step S1106, and Step S1108 in FIG. 12.

The first generating unit 134A of the information processing apparatus 1 searches for a user logging in the information processing apparatus 1 (Step S2020). The first generating unit 134A calculates the number of all the logging-in users (Step S2022). The first generating unit 134A determines whether the number of users logging in the information processing apparatus 1 is two or more (Step S2024). If the number of users is one (No at Step S2024), the process goes to Step S2038.

At Step S2038, the first generating unit 134A generates operation screen information in the same manner as at Step S2012 (refer to FIG. 13). The present routine is then ended.

By contrast, if the number of users is two or more (Yes at Step S2024), the first generating unit 134A repeatedly performs the processing from Step S2028 to Step S2032 on all the users other than the user serving as a target of transmission out of all the logging-in users searched for at Step S2020. As described above, the target of transmission is a user who uses the information processing terminal 2 to which operation screen information is to be transmitted. All the users other than the user serving as a target of transmission is users other than the user serving as a target of transmission out of the users logging in the information processing apparatus 1.

The first generating unit 134A determines whether a user belongs to the same group as the user serving as a target of transmission does (Step S2028). If affirmative determination is made at Step S2028 (Yes at Step S2028), the first generating unit 134A sets the user as an object to be displayed (Step S2030). By contrast, if negative determination is made at Step S2028 (No at Step S2028), the first generating unit 134A sets the user as an object to be hidden (Step S2032).

The first generating unit 134A generates login information defining the user name of the user set as an object to be displayed as the user name of a user logging in the information processing apparatus 1 (Step S2034).

The first generating unit 134A creates operation screen information with login information including the created login information (Step S2036). The present routine is then ended.

In the example illustrated in FIG. 14, the predetermined condition, which is a determination condition of a user to be displayed, is defined as a "user belonging to the same group as the user serving as a target of transmission of screen information does". As described above, however, the condition can be optionally changed. By changing the determination made at Step S2028 in FIG. 14 to determination based on a predetermined condition, it is possible to deal with various set conditions.

Thus, the information processing apparatus 1 can display an operation screen including login information in which a part of the user names of the logging-in users is hidden on the information processing terminal 2 corresponding thereto.

The following describes an operation performed to display an execution screen of the information processing apparatus 1 on the information processing terminal 2.

Figure 15:
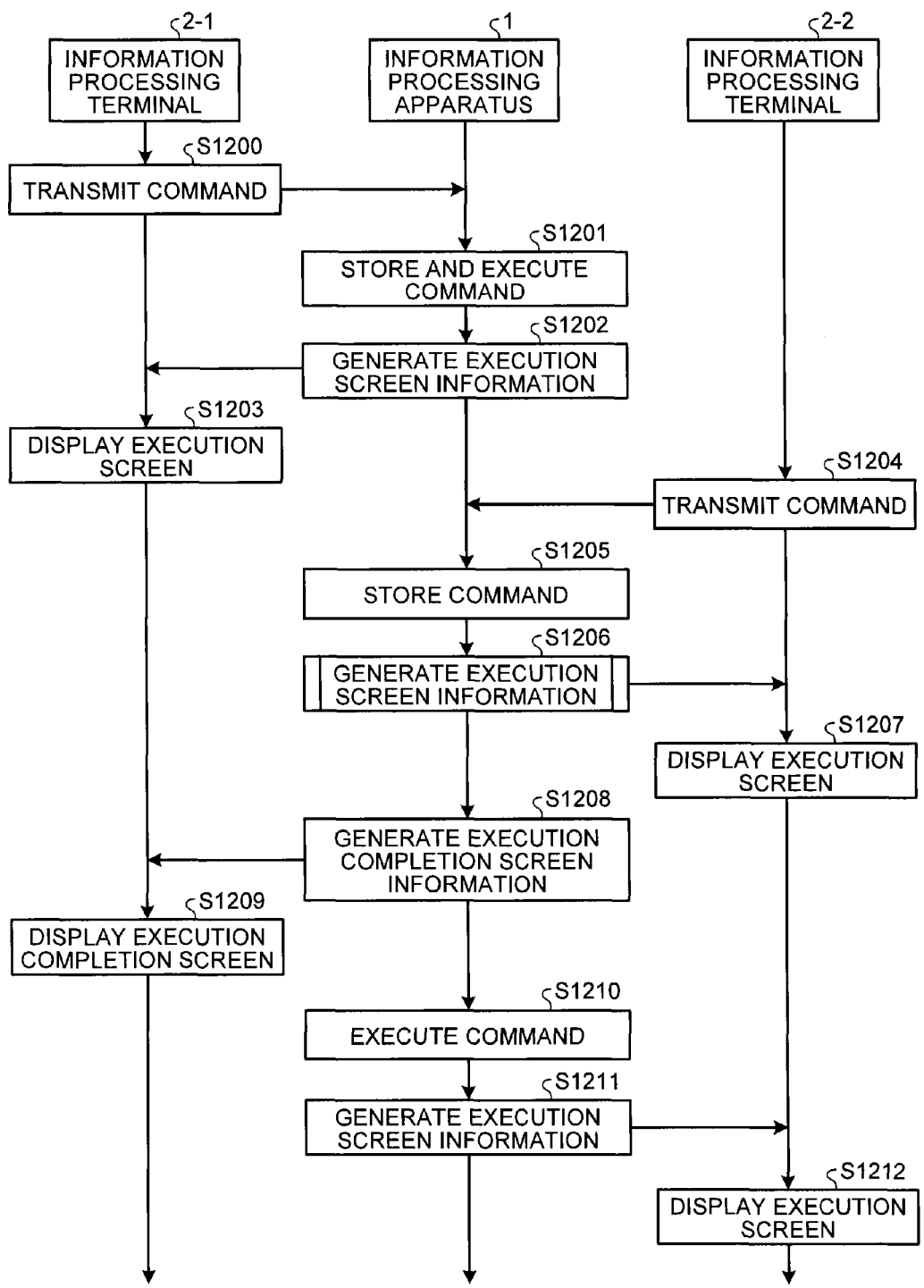
FIG. 15 is a sequence diagram of operations performed until the execution screen is displayed.

FIG. 15 is a sequence diagram of operations performed until the execution screen is displayed on the information processing terminal 2. In FIG. 15, each of the information processing terminals 2-1 and 2-2 is connected to the information processing apparatus 1 via wired or wireless communications. An assumption is made that the user A uses the information processing terminal 2-1 and that the user B uses the information processing terminal 2-2. The number and the types of information processing terminals 2 connected to the information processing apparatus 1 and the users who use the respective information processing terminals 2 are not limited thereto.

The information processing terminal 2-1 transmits a command indicating processing selected by the user A logging in the information processing apparatus 1 to the information processing apparatus 1 (Step S1200). The user A operates the operating unit 222 through the operation screen displayed on the first display unit 221 of the information processing terminal 2-1, thereby selecting processing to be performed by the information processing apparatus 1. The information processing terminal 2-1 transmits the command indicating the selected processing to the information processing apparatus 1.

The information processing apparatus 1 stores command information on the command received from the information processing terminal 2-1 in the command management DB 137. At the point of Step S1201, the command management DB 137 stores therein no command information on other commands being executed or waiting to be executed by the information processing apparatus 1. As a result, the information processing apparatus 1 causes the executing unit 101 to execute the command received from the information processing terminal 2-1 (Step S1201).

The information processing apparatus 1 starts to execute the command, generates execution screen information corresponding to the command being executed, and transmits the execution screen information to the information processing terminal 2-1 (Step S1202). The information processing terminal 2-1 receives the execution screen information and then generates display information for the execution screen based on the received execution screen information. The information processing terminal 2-1 displays the execution screen on the first display unit 221 (Step S1203).

By contrast, the information processing terminal 2-2 transmits a command indicating processing selected by the user B logging in the information processing apparatus 1 to the information processing apparatus 1 (Step S1204). The user B operates the operating unit 222 through the operation screen displayed on the first display unit 221 of the information processing terminal 2-2, thereby selecting processing to be performed by the information processing apparatus 1. The information processing terminal 2-2 transmits the command indicating the selected processing to the information processing apparatus 1.

The information processing apparatus 1 stores command information on the command received from the information processing terminal 2-2 in the command management DB 137 (Step S1205). The information processing apparatus 1 performs execution screen information generation processing (Step S1206) (which will be described later in detail). At the point of Step S1205, the command management DB 137 already stores therein the command indicating the processing selected by the user A. As a result, the information processing apparatus 1 generates execution screen information with standby information. The standby information indicates that the command (job) instructed by the other user A is being executed and that the command of the user B waits to be executed. The information processing apparatus 1 transmits the execution screen information with standby information to the information processing terminal 2-2.

The information processing terminal 2-2 receives the execution screen information with standby information from the information processing apparatus 1. The information processing terminal 2-2 generates display information for the execution screen based on the execution screen information with standby information. The information processing terminal 2-2 displays the execution screen on the first display unit 221 of the information processing terminal 2-2 (Step S1207). Thus, the first display unit 221 displays the execution screen 400A illustrated in FIG. 11.

If the information processing apparatus 1 completes execution of the command received from the information processing terminal 2-1, the information processing apparatus 1 generates execution completion information (Step S1208). The information processing apparatus 1 transmits screen information including the execution completion information to the information processing terminal 2-1.

The information processing terminal 2-1 receives the screen information including the execution completion information from the information processing apparatus 1. The information processing terminal 2-1 displays an execution completion screen on the first display unit 221 of the information processing terminal 2-1 (Step S1209).

After completing execution of the command received from the information processing terminal 2-1, the information processing apparatus 1 deletes the command information on the command stored in the command management DB 137. The information processing apparatus 1 causes the executing unit 101 to execute the command identified by the command information received from the information processing terminal 2-2 and stored in the command management DB 137 (Step S1210).

The information processing apparatus 1 starts to execute the command, generates execution screen information corresponding to the command being executed, and transmits the execution screen information to the information processing terminal 2-2 (Step S1211). The information processing terminal 2-2 receives the execution screen information and generates display information for the execution screen based on the received execution screen information. The information processing terminal 2-2 displays the execution screen on the first display unit 221 (Step S1212).

Figure 16:
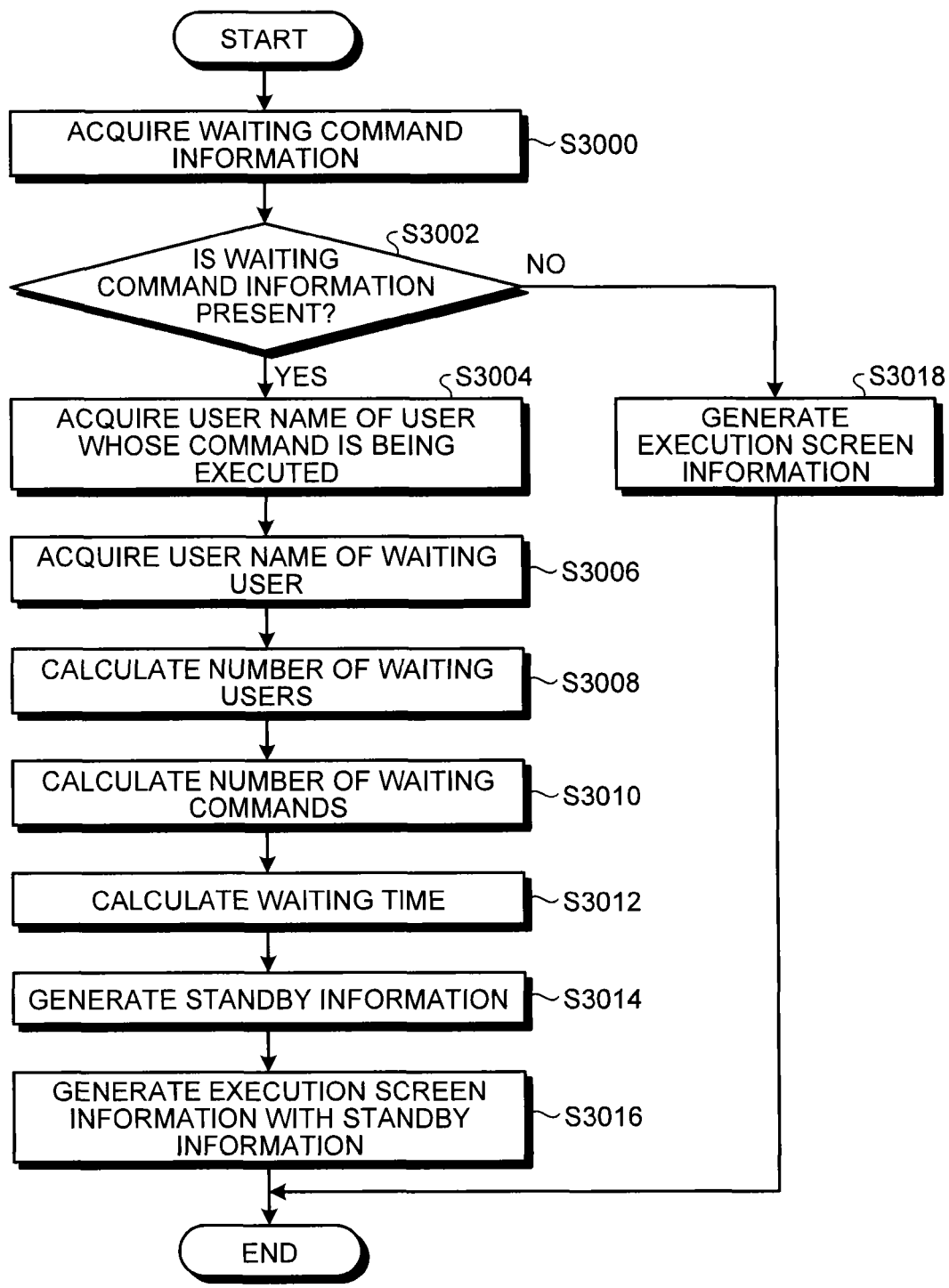
FIG. 16 is a flowchart of a process of execution screen information generation processing.

FIG. 16 is a flowchart of a process of the execution screen information generation processing performed at Step S1206 in FIG. 15.

The first generating unit 134A of the information processing apparatus 1 acquires waiting command information from the command management DB 137 (Step S3000).

The first generating unit 134A determines whether another piece of waiting command information is present in the command management DB 137 (Step S3002). The first generating unit 134A determines whether the command management DB 137 stores therein command information, thereby making the determination at Step S3002.

If the command management DB 137 stores therein no command information (No at Step S3002), the process goes to Step S3018. The first generating unit 134A generates execution screen information including no standby information (Step S3018), and the present routine is ended.

By contrast, if the command management DB 137 stores therein command information (Yes at Step S3002), the process goes to Step S3004.

The first generating unit 134A acquires the user name of a user whose command is being executed (Step S3004). The first generating unit 134A acquires the user name of a user waiting for execution of processing (Step S3006).

The first generating unit 134A calculates the number of waiting users (Step S3008). The first generating unit 134A calculates the number of waiting commands (Step S3010). The first generating unit 134A calculates the waiting time until execution of processing (Step S3012).

The first generating unit 134A generates standby information including at least one of the acquired user name of the user whose command is being executed, the acquired user name of the waiting user, the calculated number of waiting users, the calculated number of waiting commands, and the calculated waiting time until execution of processing (Step S3014).

The first generating unit 134A generates execution screen information including the standby information, thereby generating execution screen information with standby information (Step S3016). The present routine is then ended.

As described above, if a plurality of users are logging in the information processing apparatus 1 according to the present embodiment, the information processing apparatus 1 transmits execution screen information with standby information to the information processing terminal 2. The information processing terminal 2 displays an execution screen including standby information on the first display unit 221.

This enables a user logging in the information processing apparatus 1 with the information processing terminal 2 to readily understand the login status and the state of processing (job) of other users on the information processing terminal 2. The user who uses the information processing terminal 2 can cause the information processing apparatus 1 to efficiently perform processing (job) in consideration of the usage of the information processing apparatus 1. The information processing system according to the present embodiment can improve the convenience for the user.

In the embodiments above, while the first display unit 221 of the information processing terminal 2 is displaying an operation screen or an execution screen, the information processing apparatus 1 does not display the operation screen or the execution screen on the second display unit 113A (refer to FIG. 3).

In this case, when finishing display of the screen on the first display unit 221 of the information processing terminal 2, the information processing terminal 2 transmits end information indicating that the display of the screen is finished to the information processing apparatus 1. The end information includes the user ID of the information processing terminal 2 serving as the source of the end information.

After the second receiving unit 140 (refer to FIG. 8) of the information processing apparatus 1 receives the end information from the information processing terminal 2, the second receiving unit 140 outputs the end information to the command processing unit 133A. The command processing unit 133A simply needs to control the operation display control unit 104 such that, from when screen information is previously transmitted to the information processing terminal 2 used by the user identified by the user ID included in the end information to when the end information is received, the screen (the operation screen or the execution screen) is not displayed on the second display unit 113A.

This can prevent display, on the information processing apparatus 1, of the operation screen and the execution screen being displayed on the information processing terminal 2 used by the user logging in the information processing apparatus 1. This can prevent the situation in which the operation screen and the execution screen are viewed by users other than the user. Thus, it is possible to improve the security.

The operation screen and the execution screen being displayed on the information processing terminal 2 may also be displayed on the information processing apparatus 1 in response to an operating instruction given by the user through the information processing terminal 2. Alternatively, the operation screen and the execution screen being displayed on the information processing terminal 2 may be displayed on the information processing apparatus 1 instead of the information processing terminal 2 in response to an operating instruction given by the user through the information processing terminal 2.

This enables the user to perform an operation on the information processing apparatus 1 from either of the information processing terminal 2 or the information processing apparatus 1 as needed. Thus, it is possible to further improve the convenience for the user.

When a communication error occurs between the information processing terminal 2 and the information processing apparatus 1, and the second display unit 113A of the information processing apparatus 1 displays no operation screen, the information processing apparatus 1 may display an operation screen and an execution screen corresponding to the operation screen information and the execution screen information, respectively, to be transmitted to the information processing terminal 2 having the communication error. This enables the user to continue the operation on the information processing apparatus 1 through the operation screen and the execution screen displayed on the information processing apparatus 1 even when a communication error occurs between the information processing terminal 2 and the information processing apparatus 1. Thus, it is possible to further improve the convenience for the user.

When the display contents on the second display unit 113A of the information processing apparatus 1 are switched to the operation screen or the execution screen of the information processing terminal 2 because of a communication error, for example, the first display unit 221 of the information processing terminal 2 may display a screen that notifies the user of the fact. When the communications between the information processing terminal 2 and the information processing apparatus 1 are restored, the operation screen or the execution screen, which has been temporarily displayed on the information processing apparatus 1, may be redisplayed on the first display unit 221 of the information processing terminal 2.

In the embodiments above, the user information stored in the user information DB 231 includes the user's use history of the information processing apparatus 1. This is given by way of example, and the use history may be stored in the authentication information DB 131, for example. In this case, the authentication information DB 131 may store therein the authentication information and the use history of the user identified by the user ID included in the authentication information in a manner associated with each other.

In the embodiments above, the first generating unit 134 and the first generating unit 134A generate the operation screen information including an image indicating processing previously selected by the user based on the use history included in the user information received from the information processing terminal 2. The first generating unit 134 and the first generating unit 134A may generate the operation screen information based on the processing and setting information most frequently selected by the user with reference to the use history. Alternatively, the first generating unit 134 and the first generating unit 134A may generate the operation screen information based on processing and setting information set in advance in the user information.

The screen (e.g., the operation screen and the execution screen) displayed on the information processing terminal 2 is provided as a graphical user interface (GUI) of an application for the information processing terminal 2 used to operate the information processing apparatus 1. Alternatively, the screen (e.g., the operation screen and the execution screen) displayed on the information processing terminal 2 may be provided as a home screen from which a user operation is started on the information processing terminal 2.

In the embodiments above, the information processing apparatus 1 is an MFP, for example. The information processing apparatus 1 simply needs to be an apparatus that performs one or a plurality of pieces of processing in response to a command as described above and is not limited to an MFP.

In the case where the information processing apparatus 1 is a guide apparatus, for example, the first display units 221 of the information processing terminals 2 used by respective users each display a route to a place specified by the corresponding user and the waiting time until a dish specified by the corresponding user is completed, for example, through execution of each piece of the processing described above.

A computer program executed in the information processing apparatus 1 and the information processing terminal 2 according to the embodiments to perform the process described above is embedded and provided in a ROM 30 (refer to FIG. 2), for example.

The computer program executed in the information processing apparatus 1 and the information processing terminal 2 according to the embodiments to perform the process described above may be recorded and provided in a computer-readable recording medium such as a compact disc read only memory (CD-ROM), a flexible disk (FD), a compact disc recordable (CD-R), and a digital versatile disc (DVD), as an installable or executable file.

The computer program executed in the information processing apparatus 1 and the information processing terminal 2 according to the embodiments to perform the process described above may be stored in a computer connected to a network such as the Internet and provided by being downloaded via the network. Furthermore, the computer program executed in the information processing apparatus 1 and the information processing terminal 2 according to the embodiments to perform the process described above may be provided or distributed via a network such as the Internet.

The computer program executed in the information processing apparatus 1 and the information processing terminal 2 according to the embodiments to perform the process described above has a module configuration comprising each unit described above (the first receiving unit 136, the authentication processing unit 132, the command processing unit 133, the command processing unit 133A, the login processing unit 132A, the logoff processing unit 132B, the first generating unit 134, the first generating unit 134A, the first transmitting unit 138, the fourth receiving unit 139, the second receiving unit 140, the second transmitting unit 232, the user information DB 231, the receiving unit 233, the third receiving unit 235, and the second generating unit 234). In actual hardware, the CPU 10 (refer to FIG. 2) reads and executes the computer program from the ROM 30 (refer to FIG. 2) to load each unit on the main memory. Thus, each functional unit is generated on the main memory.

According to an aspect of the present embodiments, there is provided a non-transitory computer-readable medium includes computer readable program codes, performed by the information processing apparatus, the program codes when executed causing the information processing apparatus to execute: receiving pieces of user information on a plurality of users from a plurality of information processing terminals used by the users; performing authentication processing of the users based on the pieces of user information; generating screen information on a screen used to operate the information processing apparatus for each of the authenticated users; and transmitting the screen information to the information processing terminals used by the users corresponding thereto.

According to another aspect of the present embodiments, there is provided an information processing method including: receiving pieces of user information on a plurality of users from a plurality of information processing terminals used by the users; performing authentication processing of the users based on the pieces of user information; generating screen information on a screen used to operate the information processing apparatus for each of the authenticated users; and transmitting the screen information to the information processing terminals used by the users corresponding thereto.

The present embodiments enable a plurality of users to perform operations in parallel on an information processing apparatus that requires user authentication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
circuitry configured to receive user information from each of a plurality of information processing terminals used by a plurality of users,
perform authentication processing of the users based on the user information,
generate screen information on a screen used to operate the information processing apparatus for each of the authenticated users, and
transmit the screen information to the information processing terminals used by the users corresponding thereto,
wherein the circuitry generates the screen information including login information indicating the users who are authenticated and are logging in the information processing apparatus.

2. The information processing apparatus according to claim 1, wherein the screen is a screen to be displayed on a display of the information processing terminals used by the users.

3. An information processing apparatus comprising:
a first receiving unit that receives user information from each of a plurality of information processing terminals used by a plurality of users;
an authentication processing unit that performs authentication processing of the users based on the user information;
a first generating unit that generates screen information on a screen used to operate the information processing apparatus for each of the authenticated users;
a first transmitting unit that transmits the screen information to the information processing terminals used by the users corresponding thereto;
an executing unit that performs processing corresponding to commands;
a second receiving unit that receives the commands indicating processing to be performed by the executing unit from the information processing terminals; and
a command processing unit that causes the executing unit to perform the processing corresponding to the received commands, wherein
the first generating unit generates the screen information including standby information indicating a standby state of the commands based on a command yet to be completed out of the received commands.

4. The information processing apparatus according to claim 3, further comprising:
a second display unit that displays the screen, wherein
the second receiving unit receives end information indicating that display of the screen on a first display unit of the information processing terminals is finished from the information processing terminals, and
the command processing unit performs control such that, at least from when the screen information is transmitted to the information processing terminals to when the end information is received from the information processing terminals, the screen of the screen information is not displayed on the second display unit.

5. An information processing apparatus comprising:
a first receiving unit that receives user information from each of a plurality of information processing terminals used by a plurality of users;
an authentication processing unit that performs authentication processing of the users based on the user information;
a first generating unit that generates screen information on a screen used to operate the information processing apparatus for each of the authenticated users; and
a first transmitting unit that transmits the screen information to the information processing terminals used by the users corresponding thereto, wherein
the first generating unit generates the screen information for each of the users based on a use history of the information processing apparatus of the users.

6. An information processing system comprising:
a plurality of information processing terminals; and
an information processing apparatus connected to the information processing terminals, wherein
the information processing apparatus includes first circuitry that
receives user information from each of the information processing terminals used by a plurality of users,
performs authentication processing of the users based on the user information,
generates screen information on a screen used to operate the information processing apparatus for each of the authenticated users, and
transmits the screen information to the information processing terminals used by the users corresponding thereto, and
the information processing terminals include second circuitry that
that transmits the user information to the information processing apparatus,
receives the screen information from the information processing apparatus, and
displays the screen corresponding to the screen information, wherein
the first circuitry generates the screen information including login information indicating the users who are authenticated and are logging in the information processing apparatus.

* * * * *